(12) United States Patent
Suzuki et al.

(10) Patent No.: US 7,025,816 B2
(45) Date of Patent: Apr. 11, 2006

(54) ANTHRAQUINONE DYE AND INKJET RECORDING LIQUID

(75) Inventors: Takatugu Suzuki, Hachioji (JP); Satoru Ikesu, Fuchu (JP); Mari Takahashi, Asaka (JP)

(73) Assignee: Konica Minolta Holdings, Inc., (JP)

( * ) Notice: Subject to any disclaimer, the term of this patent is extended or adjusted under 35 U.S.C. 154(b) by 0 days.

(21) Appl. No.: 10/986,981

(22) Filed: Nov. 12, 2004

(65) Prior Publication Data

US 2005/0103226 A1    May 19, 2005

(30) Foreign Application Priority Data

Nov. 19, 2003  (JP)  ............. 2003-388916

(51) Int. Cl.
*C09D 11/02* (2006.01)
*C07D 417/04* (2006.01)

(52) U.S. Cl. .................. 106/31.47; 544/13

(58) Field of Classification Search ............ 106/31.47; 544/13
See application file for complete search history.

(56) References Cited

U.S. PATENT DOCUMENTS

| | | | |
|---|---|---|---|
| 2,187,812 A | 1/1940 | Baumann et al. | 544/293 |
| 3,839,332 A | 10/1974 | Moergeli | 544/187 |
| 5,916,364 A * | 6/1999 | Izumi | 106/31.47 |
| 6,152,969 A * | 11/2000 | Matsumoto et al. | 8/658 |
| 6,645,283 B1 * | 11/2003 | Matsumoto et al. | 106/31.47 |
| 6,843,839 B1 * | 1/2005 | Kanke et al. | 106/31.47 |
| 6,846,351 B1 * | 1/2005 | Iwamoto et al. | 106/31.47 |
| 2003/0070580 A1 * | 4/2003 | Blease et al. | 106/31.27 |
| 2004/0106782 A1 * | 6/2004 | Iwamoto et al. | 534/653 |
| 2004/0239739 A1 * | 12/2004 | Matsumoto et al. | 347/100 |
| 2004/0254262 A1 * | 12/2004 | Ikesu et al. | 523/160 |
| 2005/0115458 A1 * | 6/2005 | Oki et al. | 106/31.47 |

FOREIGN PATENT DOCUMENTS

| JP | 59-074173 | * | 4/1984 |
|---|---|---|---|
| JP | 02-016171 | * | 1/1990 |

OTHER PUBLICATIONS

Derwent abstract of JP59-074173, Apr. 1984.*
Derwent abstract of JP02-0161171, Jan. 1990.*
British Search Report for Application No. GB0425045.2 dated mailed Feb. 9, 2005.

* cited by examiner

Primary Examiner—Helene Klemanski
(74) Attorney, Agent, or Firm—Cantor Colburn LLP

(57) ABSTRACT

An anthraquinone dye represented by the Formula (1), (2) or (3), and an ink jet recording liquid containing a compound represented by the following Formula (1), (2) or (3):

Formula (1)

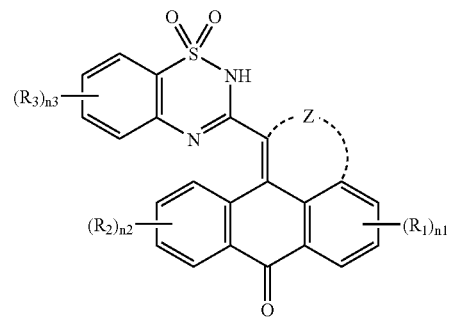

Formula (2)

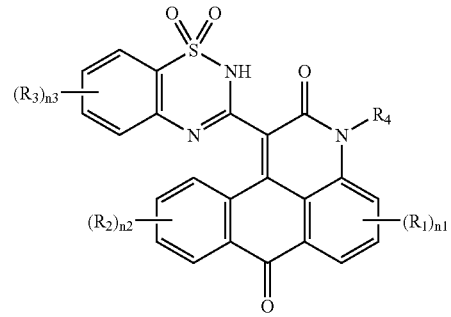

Formula (3)

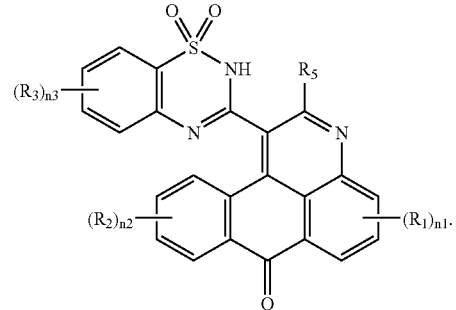

12 Claims, No Drawings

ANTHRAQUINONE DYE AND INKJET RECORDING LIQUID

FIELD OF THE INVENTION

The present invention relates to an anthraquinone dye and further to an inkjet recording liquid containing said dye.

BACKGROUND OF THE INVENTION

Heretofore, anthraquinone type compounds have been widely utilized in the field of such as dyeing of fibers or as dyestuff and dyes for image formation. On the other hand, in recent years, new color image forming methods such as an inkjet recording method, a thermal transfer method, color electrophotography, printing ink and recording pens are employed in practical use.

As an inkjet recording method, generally utilized are such as a method in which liquid droplets are pressure ejected by means of electromechanical conversion of a piezo element, a method in which liquid droplets are pressure ejected by generated bubbles by means of electro-thermal conversion and a method in which liquid droplets are suction ejected by electrostatic force.

In an inkjet recording liquid (hereinafter, also referred to as inkjet ink or simply as ink), required are such as to suit a recording method selected from those described above, to be provided with a high recording image density and an excellent tone, to be superior in color image fastness such as light fastness, heat resistance and water resistance, to be fixed rapidly to a medium to be recorded and not to bleed, to be excellent in storage stability as ink, to have no problem with respect to safety such as toxicity or inflammability, and to be low-priced.

In these points of view, various inkjet recording liquids have been proposed and examined, however, very few inkjet recording liquids simultaneously satisfy most of the requirements.

In color image recording employing yellow, magenta, cyan and black, widely studied have been conventionally well known dyes and pigments having C. I. numbers, for example, described in C. I. Index. For example, in magenta ink utilizing a water-soluble dye, known are those utilizing xanthene type dyes such as C. I. Acid Red 52 and azo type dyes such as C. I. Direct Red as a water-soluble dye, which are provided with high reliability of anti-clogging in a printer, however, have problems with respect to durability such as light fastness and water resistance. On the other hand, ink employing quinacridone type pigments such as Pigment 122 is known, which is provided with high durability, however, is liable to cause problems of low printing density or poor color reproducibility such as bronzing. In this manner, it has been difficult to simultaneously satisfy both hue and durability, which are required by inkjet ink, with conventionally well known dyes or pigments.

To solve this problem, specific anthraquinone type compounds and water-based ink compositions comprised thereof (for example, refer to patent literatures 1–5) are proposed for the purpose of compatibility of tone and light fastness, however, the level is not sufficient in the rapidly progressing corresponding industry and further improvement has been desired.

On the other hand, in recent years, a proposal, in which water dispersible resin is colored with an oil-soluble dye or a hydrophobic dye, has been made as inkjet recording ink to solve problems of poor water resistance and a poor durability of light fastness in water-based ink utilizing a water-based dye. Proposed are ink comprising an oil-soluble dye being dissolved in a hydrophobic organic solvent having a high boiling point and the resulting solution is dispersed in a water-based medium (for example, refer to patent literature 7), and ink utilizing emulsion polymerized particles or dispersed polymer particles which are dyed with an oil-soluble dye (for example, refer to patent literature 7).

However, ink utilizing an oil-soluble dye is liable to cause aggregation or sedimentation of particles each other resulting in poor stability of ink. Further, it has a problem of hue when being printed as well as a disadvantage of a low printing density, so that further improvement has been required.

[Patent literature 1] JP-A No. 57-195775 (scope of claims, example 3) (Hereinafter, JP-A refers to Japanese Patent Publication Open to Public Inspection)

[Patent literature 2] JP-A No. 59-74173 (scope of claims, example 1)

[Patent literature 3] JP-A No. 2-16171 (scope of claims, example 1)

[Patent literature 4] JP-A No. 10-306221 (scope of claims, example 1)

[Patent literature 5] JP-A No. 2003-192930 (scope of claims, example 5)

[Patent literature 6] JP-A No. 2001-262018 (scope of claims, example 1)

[Patent literature 7] JP-A No. 2001-240763 (scope of claims, example 1)

DETAILED DISCRIPTION OF THE INVENTION

Problems to be Solved

The first objective of this invention is to provide an inkjet recording liquid containing a new dyestuff and being excellent in light fastness and color reproduction, and the second objective is to provide an inkjet recording liquid being excellent in storage stability of the ink in addition to the first objective.

Means to Solve the Problems

Inventors of this invention, as a result of extensive studies of the above problems, have found that the above problems can be solved by utilizing a new dye (an anthraquinone type compound) which exhibits excellent performance as a dye, and an inkjet recording liquid containing said dye, which resulted in completion of this invention.

EFFECT OF THE INVENTION

An dye image prepared according to this invention can provide an inkjet recording liquid exhibiting satisfactory light fastness and excellent color reproduction, as well as a water-based inkjet ink having excellent storage stability of ink.

MOST PREFERABLE EMBODIMENT OF THE INVENTION

This invention will be further detailed. Dyes represented by the Formula (1)–(3) according to this invention will now be detailed.

In the Formula (1)–(3), $R_1$, $R_2$ and $R_3$ represent a substituent.

Substituents represented by $R_1$, $R_2$ and $R_3$ are not specifically limited and include, for example, alkyl groups (such as methyl group, an ethyl group, a propyl group, an isopropyl group, a tert-butyl group, a pentyl group, a hexyl group, an octyl group and a dodecyl group), cycloalkyl groups (such as a cyclopentyl group and a cyclohexyl group), aryl groups (such as a phenyl group and a naphthyl group), acylamino groups (such as an acetylamino group and a benzoylamino group), alkylthio groups (such as a methylthio group and an ethylthio group), arylthio groups (such as a phenylthio group and a naphthyltio group), alkenyl groups (such as a 2-propenyl group, a 3-butenyl group, a 1-methyl-3-propenyl group, a 3-pentenyl group, a 1-methyl-3-butenyl group, a 4-hexenyl group and a cyclohexenyl group), halogen atoms (such as a fluorine atom, a chlorine atom, a bromine atom and an iodine atom), alkynyl groups (such as a propargyl group), heterocyclic groups (such as a pyridyl group, a thiazolyl group, an oxazolyl group and an imidazolyl group), alkylsulfonyl groups (such as a methylsulfonyl group and an ethylsulfonyl group), arylsulfonyl groups (such as a phenylsulfonyl and a naphthylsulfonyl), alkylsulfinyl groups (such as a methylsulfinyl group), arylsulfinyl groups (such as a phenylsulfinyl group), a phosphono group, acyl groups (such as an acetyl group, a pivaloyl group and a benzoyl group), carbamoyl groups (such as an aminocarbonyl group, a methylaminocarbonyl group, a dimethylaminocarbonyl group, a butylaminocarbonyl group, a cyclohexylainocarbonyl group, a phenylaminocarbonyl group and a 2-pyridylaminocarbonyl group), sulfamoyl groups (such as an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group and a 2-pyridylaminosulfonyl group), sulfonamide groups (such as a methanesulfonamido group and a benzenesulfonamido group), a cyano group, alkoxy groups (such as a methoxy group, an ethoxy group and a propoxy group), aryloxy groups (such as a phenoxy group and a naphthyloxy group), hetrocyclic oxy groups, a siloxy group, acyloxy groups (such as an acetyloxy group and a benzoyloxy group), a sulfonate group, salts of sulfonic acid, an aminocarbonyloxy group, amino groups (such as an amino group, an ethylamino group, a butylamino group, a cyclopentylamino group, a 2-ethylhexylamino group and a dodecylamino group), aniline groups (such as a phenylamino group, a chlorophenylamino group, a toluidino group, a anisidino group, a naphthylamino group and a 2-pyridylamino group), an imido group, ureido groups (such as a methylureido group, an ethylureido group, a pentylureido group, a cyclohexylureido group an octylureido group, a dodecylureido group, a phenylureido group, a naphthylureido group and a 2-pyridylaminoureido group), alkoxycarbonylamino groups (such as a methoxycarbonylamino group and an phenoxycarbonylamino group), alkoxycarbonyl groups (such as a methoxycarbonyl group and an ethoxycarbonyl group), aryloxycarbonyl groups (such as a phenoxycarbonyl group), heterocyclic thio groups, a thioureido group, a carboxyl group, salts of carboxylic acid, a hydroxyl group, a mercapto group and a nitro group.

These substituents may be further substituted with similar substituents.

$R_1$ is preferably a halogen atom, an alkoxy group, an aryloxy group, a sulfonate group, a salt of sulfonic acid, an anilino group, an alkylamino group, an acylamino group or a sulfonamide group, and more preferably an alkoxy group, an aryloxy group, an anilino group or a sulfonamide group.

In the Formula (2), $R_4$ represents a hydrogen atom or a substituent.

The substituents include similar groups to those represented by $R_1$ described above, and these substituents may be further substituted by similar substituents.

$R_4$ is preferably a hydrogen atom, an alkyl group, a cycloalkyl group or an aryl group, more preferably a hydrogen atom or an alkyl group and most preferably a hydrogen atom or a methyl group.

In the Formula (3), $R_5$ represents a hydrogen atom or a substituent.

The substituents include similar groups to those represented by $R_1$ described above, and these substituents may be further substituted by similar substituents.

$R_5$ is preferably an alkyl group, a cycloalkyl group, an aryl group, a halogen atom, an alkoxy group, an amino group or an aniline group and more preferably an amino group or an aniline group.

In the Formula (1), Z represents a non-metal atom group necessary to form a nitrogen-containing 6-membered heterocyclic ring. Heterocyclic rings formed by Z include a pyridine ring, a pyridazine ring and a pyridine ring and more preferably a pyridine ring and a pyridine ring.

Rings formed by Z may be provided with a substituent, and the substituent includes groups similar to those represented by $R_1$, $R_2$ and $R_3$.

In the Formula (1)–(3), n1 represents whole number of 0 to 3 and a plural number of $R_1$ may be same as or different from each other when n1 is 2 or more. n1 is preferably 1 or 2.

n2 represents whole number of 0 to 4 and a plural number of $R_2$ may be same as or different from each other when n2 is 2 or more. n2 is preferably 0.

n3 represents whole number of 0 to 4 and a plural number of $R_3$ may be same as or different from each other when n3 is 2 or more. n3 is preferably 0, 1 or 2 and most preferably 0.

Dyes represented by the Formula (1)–(3) may be tautomerism structures represented by the Formula (4)–(6), respectively.

Formula (4)

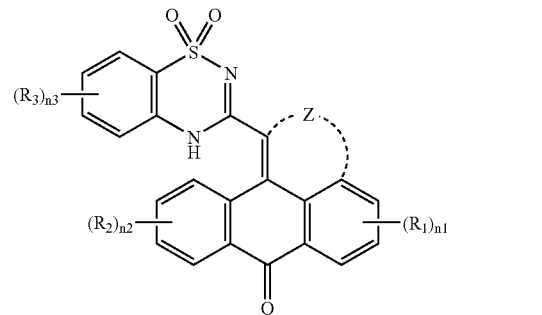

wherein $R_1$, $R_2$, $R_3$, Z, n1, n2 and n3 are identical with $R_1$, $R_2$, $R_3$, Z, n1, n2 and n3 in the Formula (1).

Formula (5)

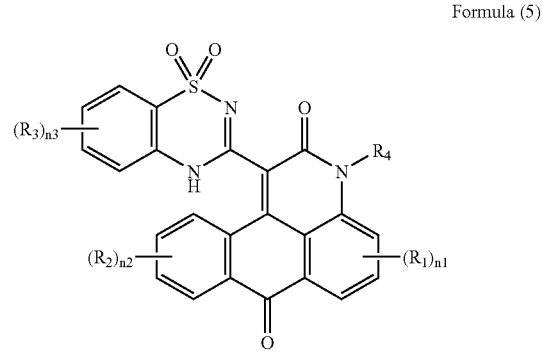

wherein $R_1$, $R_2$, $R_3$, $R_4$, Z, n1, n2 and n3 are identical with $R_1$, $R_2$, $R_3$, $R_4$, Z, n1, n2 and n3 in the Formula(2).

Formula (6)

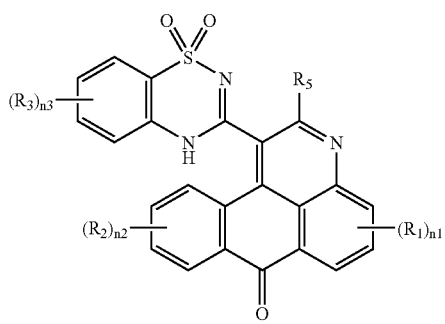

wherein $R_1$, $R_2$, $R_3$, $R_5$, Z, n1, n2 and n3 are identical with $R_1$, $R_2$, $R_3$, $R_5$, Z, n1, n2 and n3 in the Formula (2).

In the following, shown are specific examples of dyes represented by the Formula (1)–(3), however this invention is not limited thereto. Herein, M in the chemical structures represents a hydrogen atom, an alkali metal atom, an alkali earth metal atom or quaternary ammonium, wherein alkali metal atoms include such as a lithium atom, a sodium atom and a potassium atom, alkali earth metal atoms include such as a magnesium atom and a calcium atom and quaternary ammoniums include methylammonium, dimethylammonium, trimethylammonium, tetramethylammonium and tetrabutylammonium.

1-1

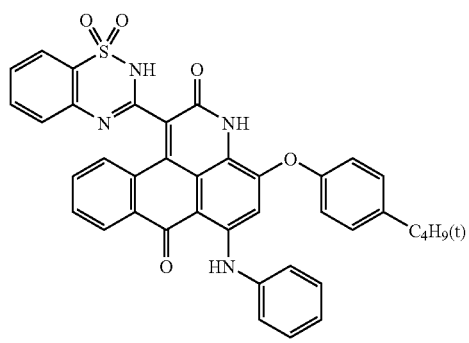

1-2

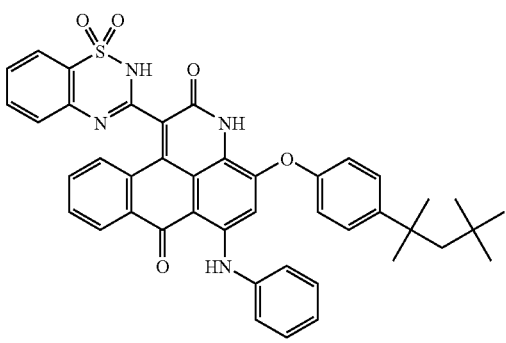

1-3

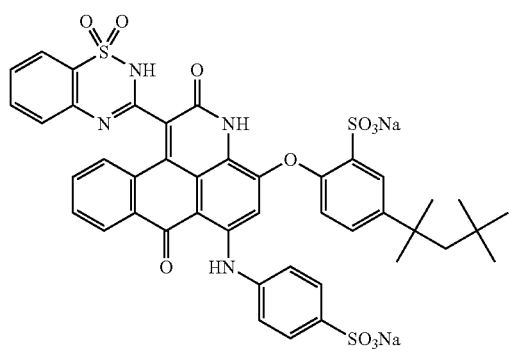

1-4

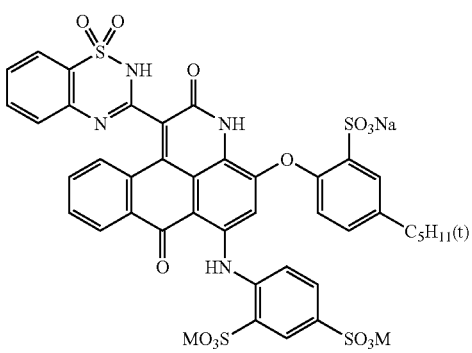

1-5

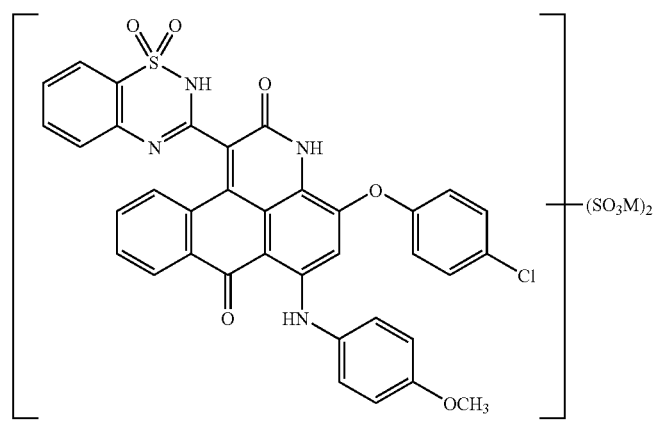

-continued
1-6
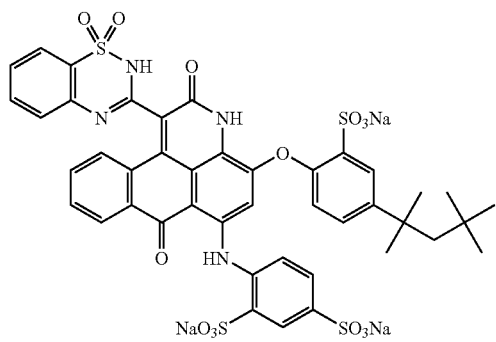
1-7
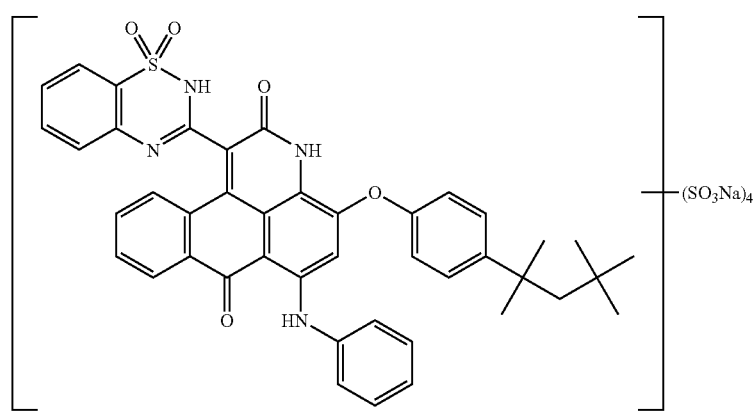
1-8
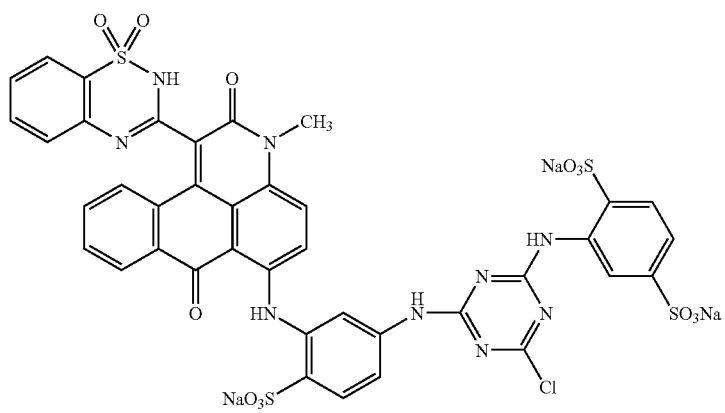
1-9
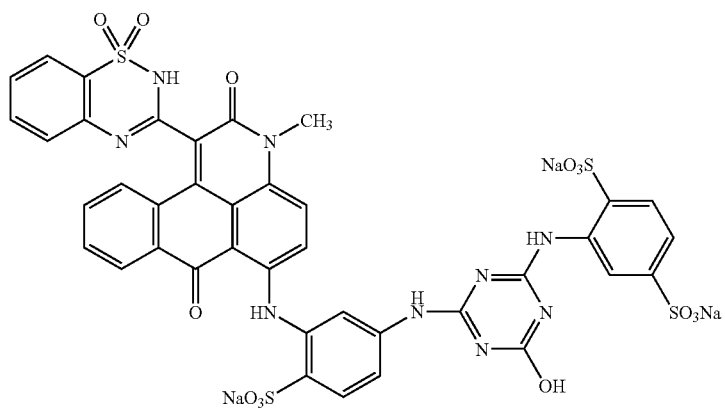

-continued
1-10
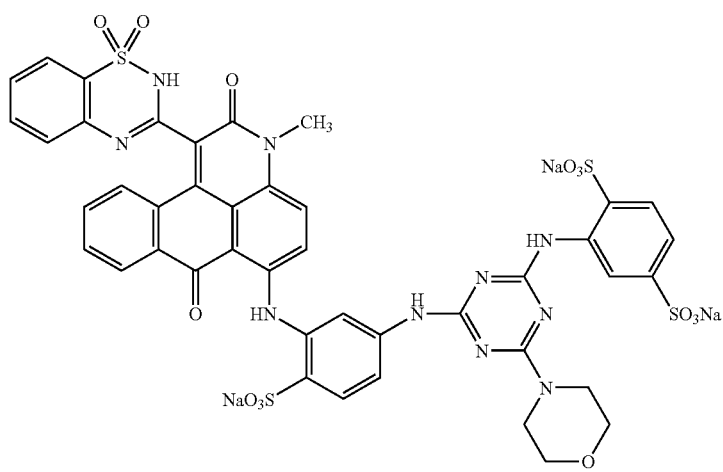
1-11
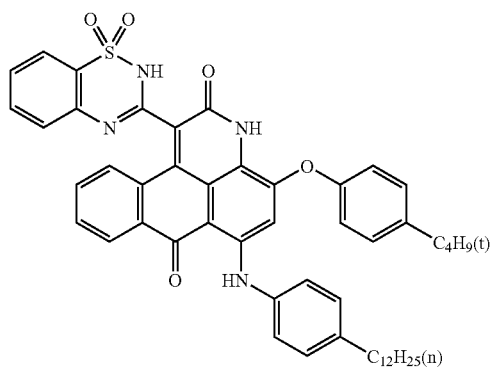
1-12
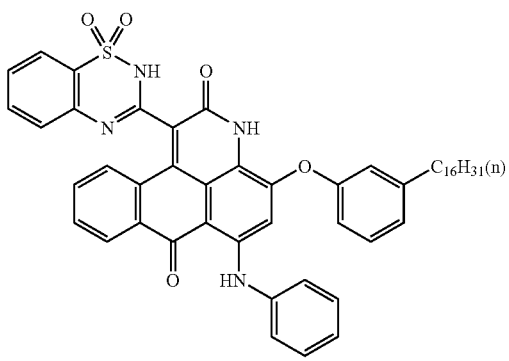
1-13
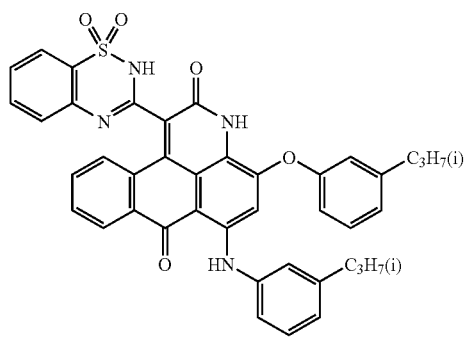
1-14
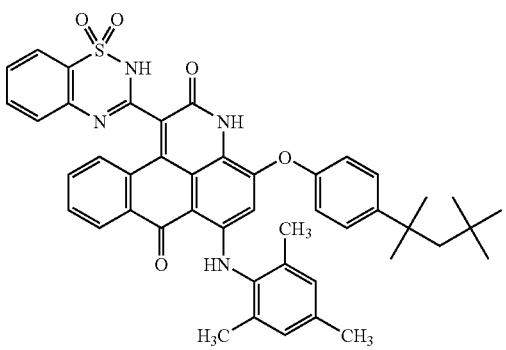
1-15
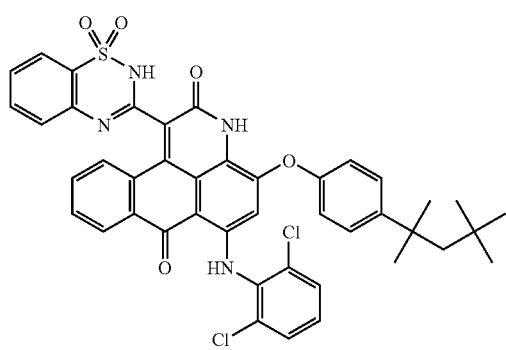
1-16
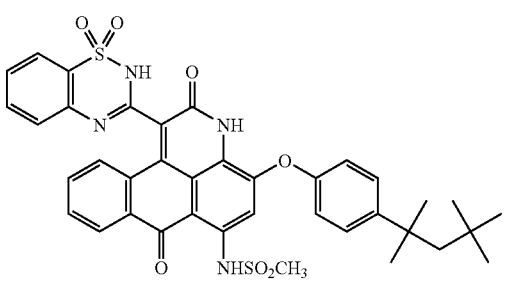

-continued
1-17
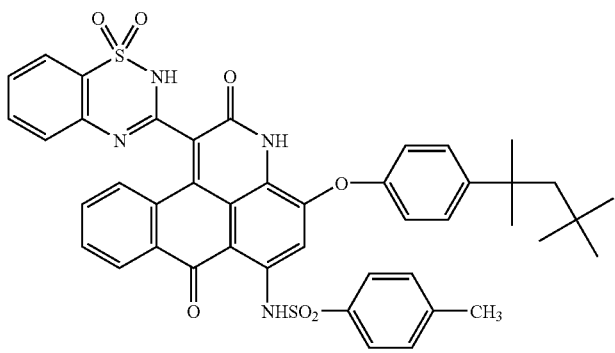
1-18
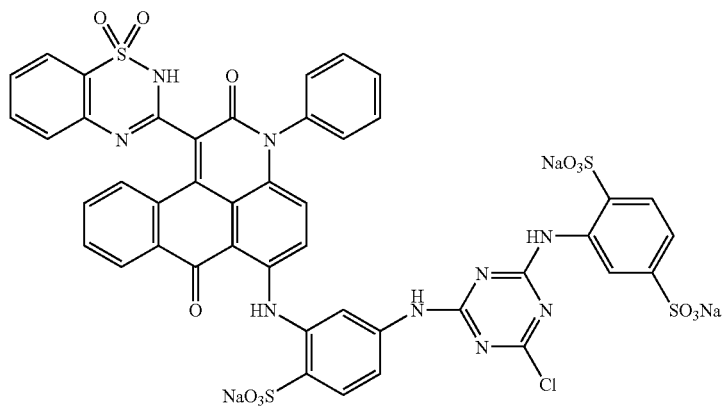
1-19
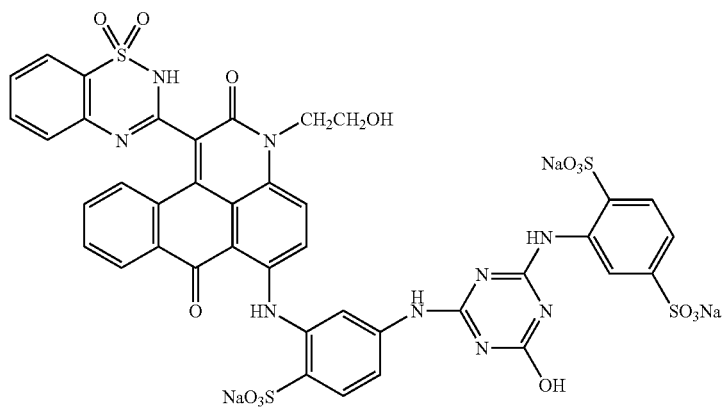
1-20
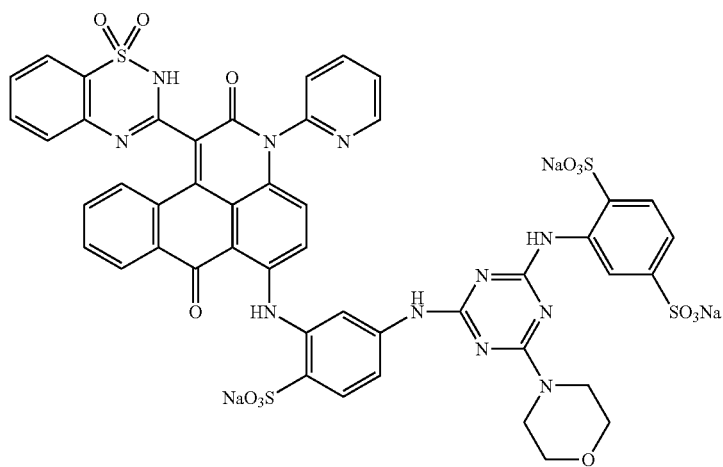

-continued
1-21
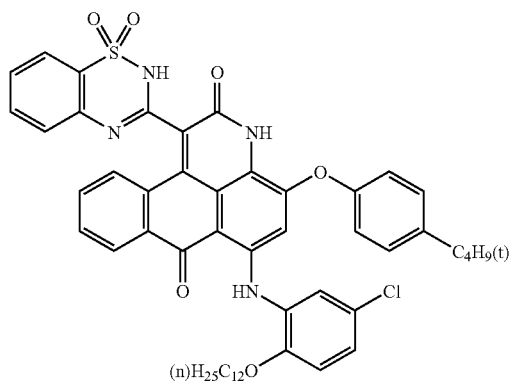
1-22
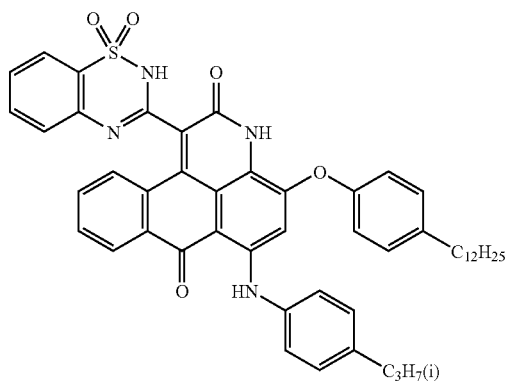
1-23
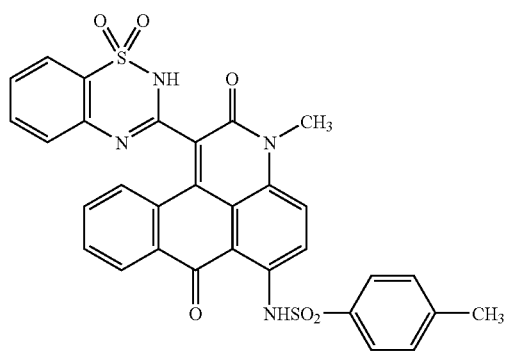
1-24
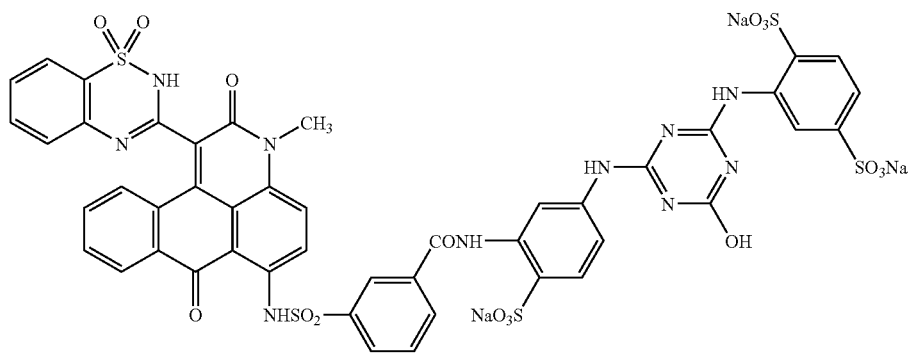
1-25
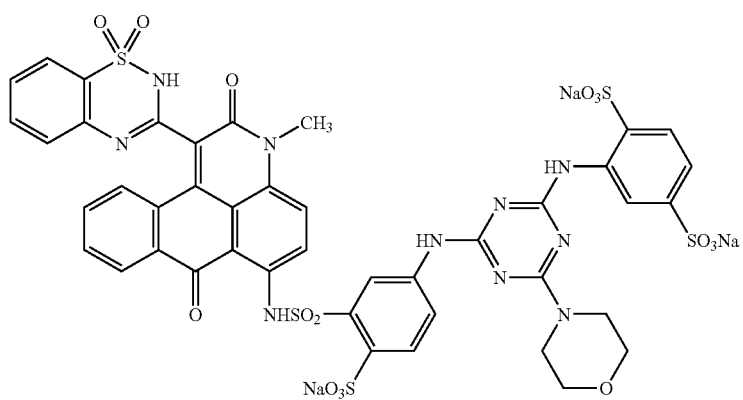

-continued
1-26
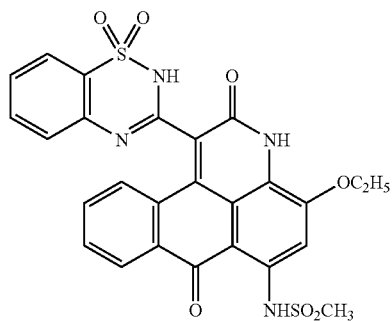
1-27
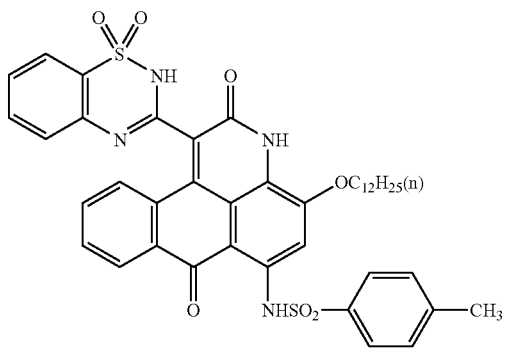
1-28
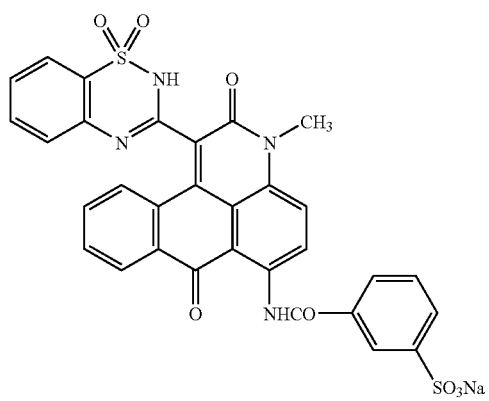
1-29
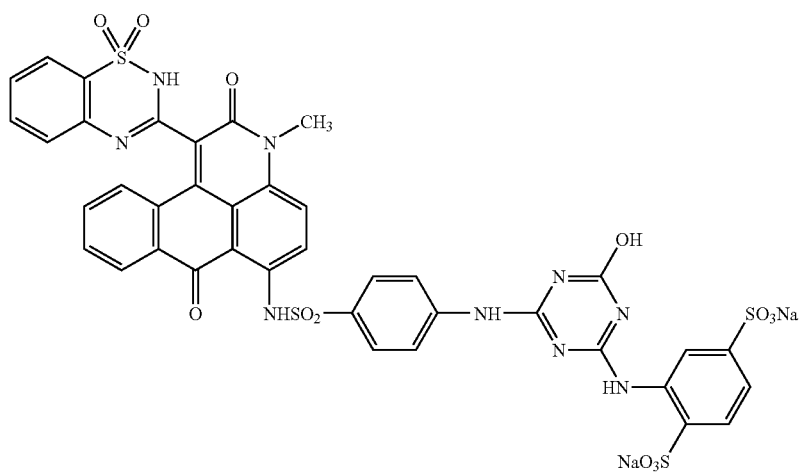
1-30
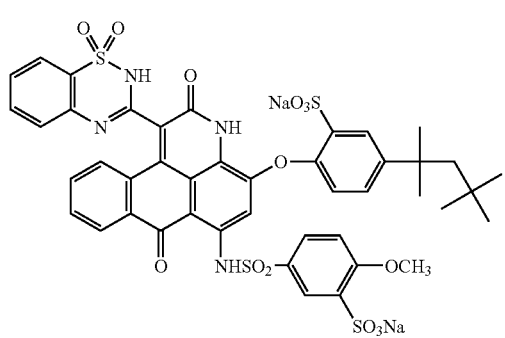
1-31
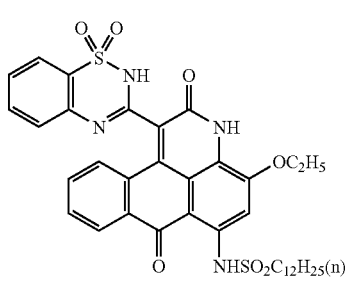

-continued
1-32
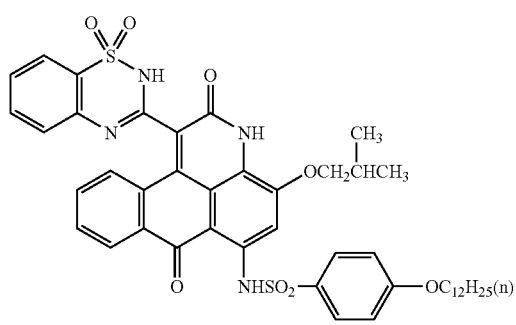
1-33
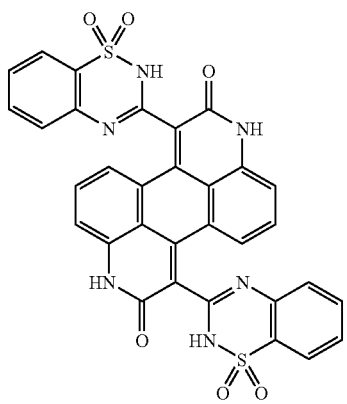
1-34
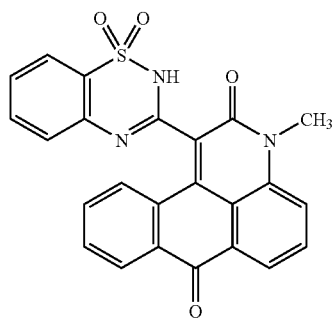
1-35
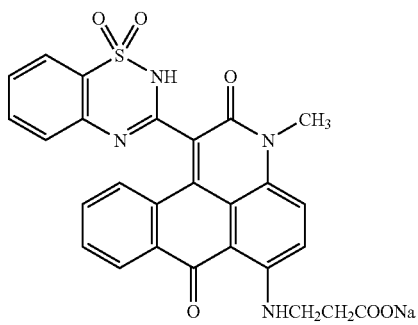
1-36
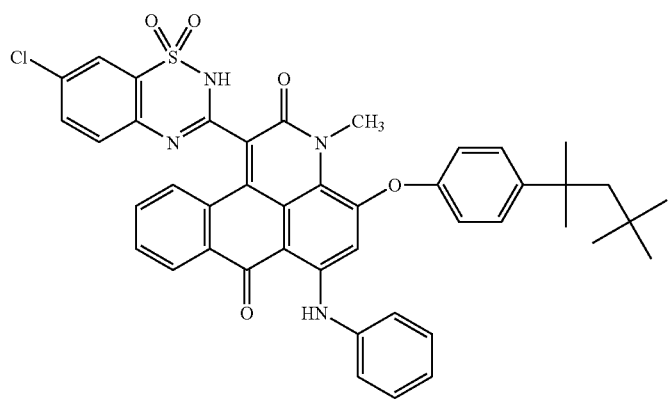
1-37
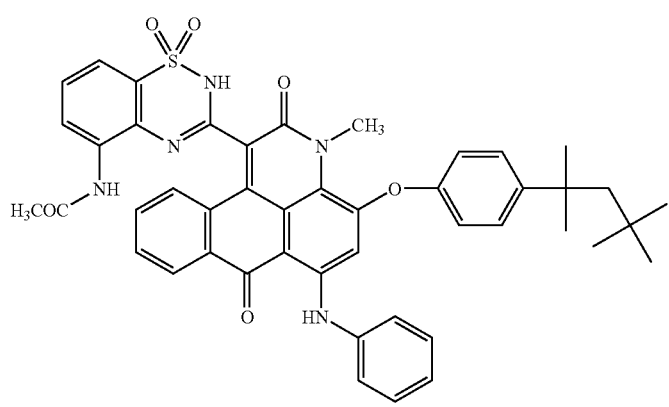

-continued
1-38
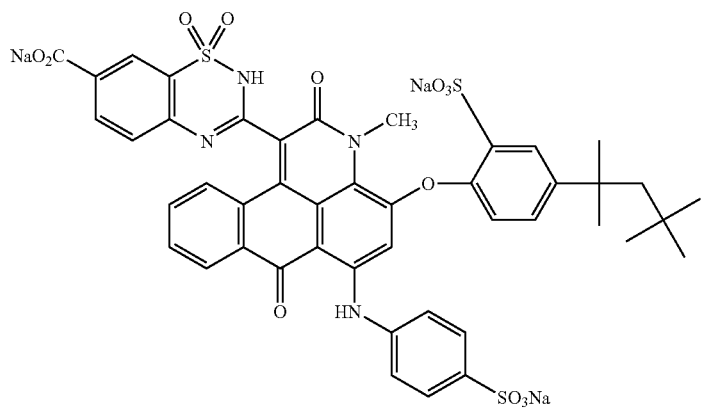
1-39
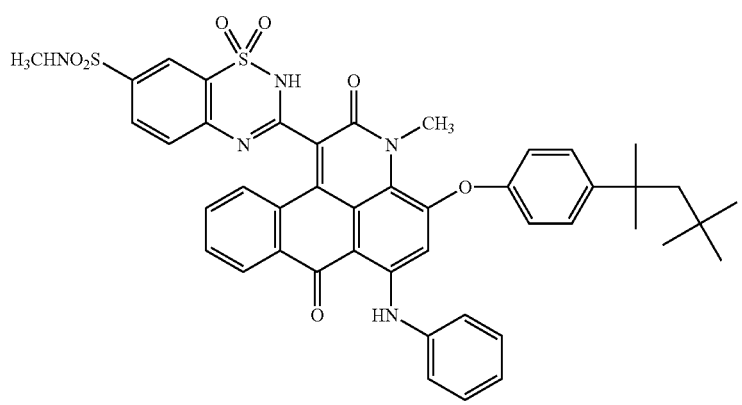
1-40
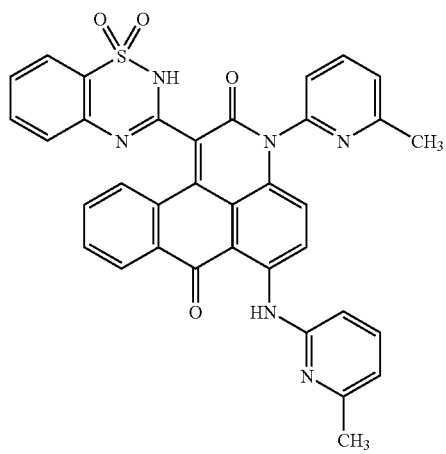
1-41
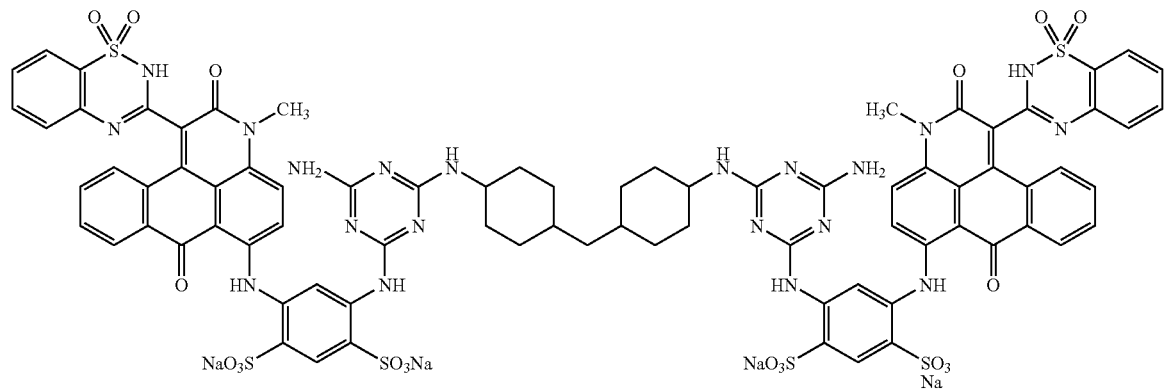

1-42
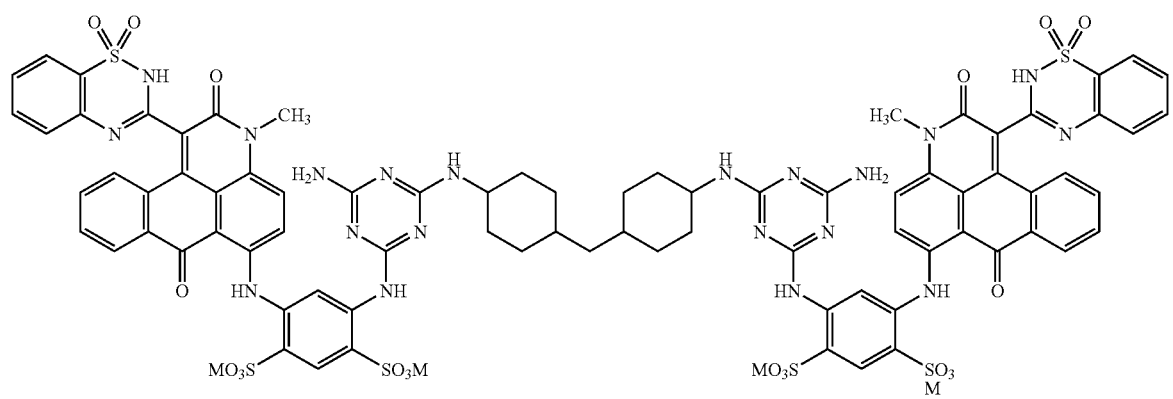
1-43
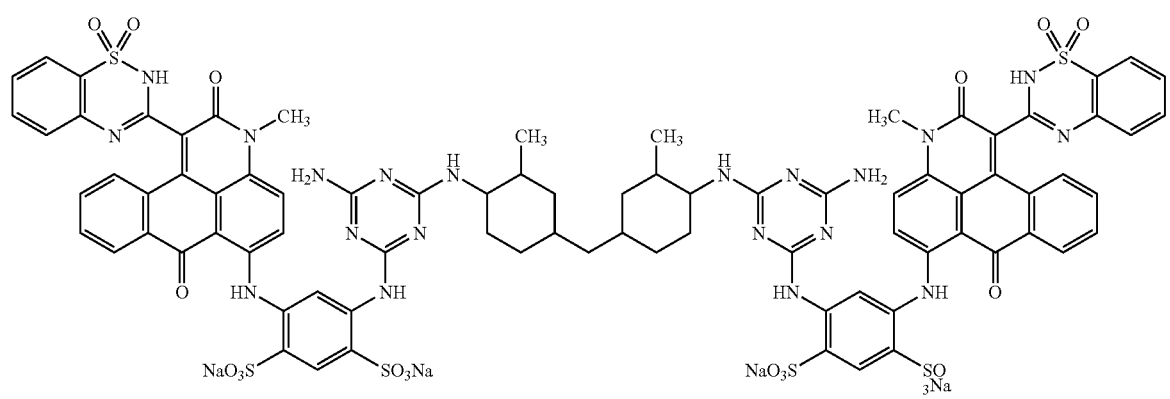
1-44
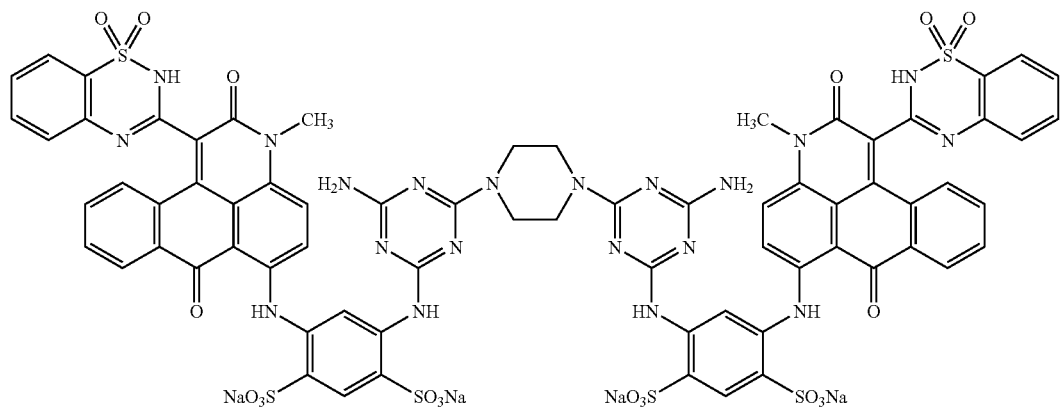

-continued
1-45
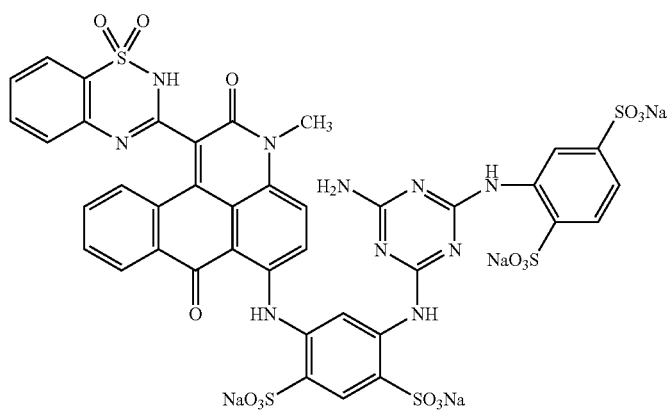
1-46
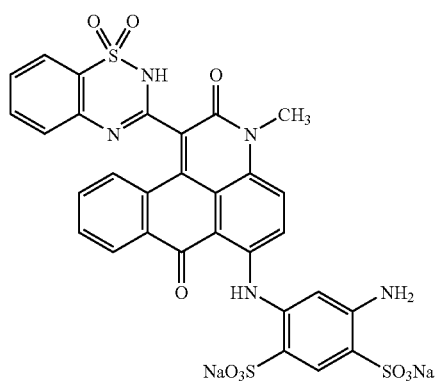
1-47
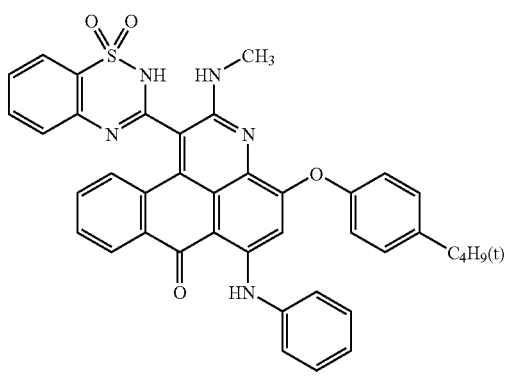
1-48
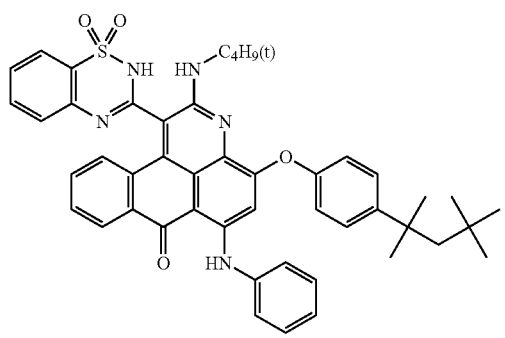
1-49
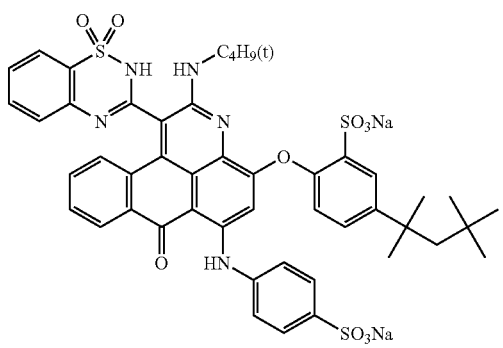
1-50
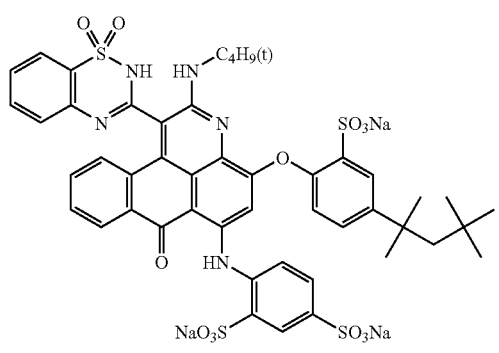
1-51
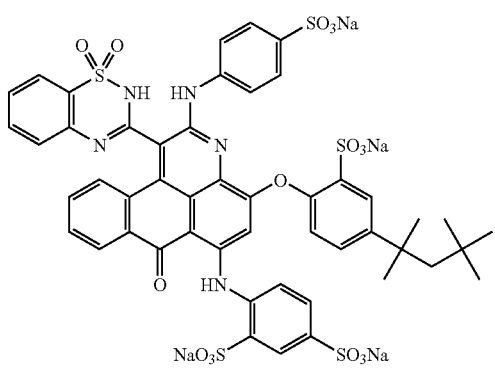

1-52
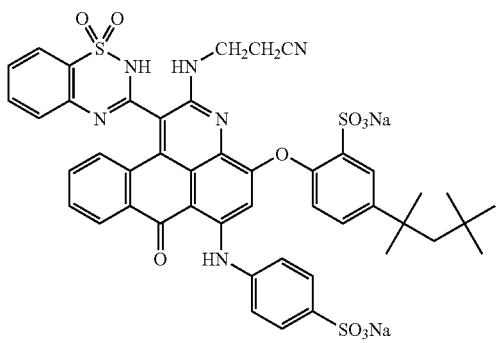
1-53
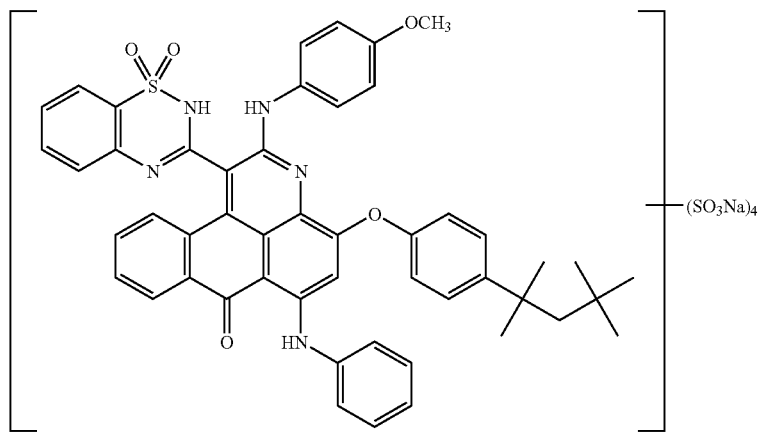
1-54
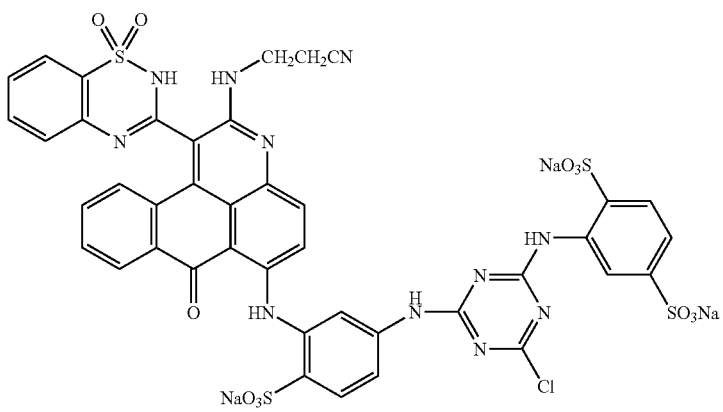
1-55
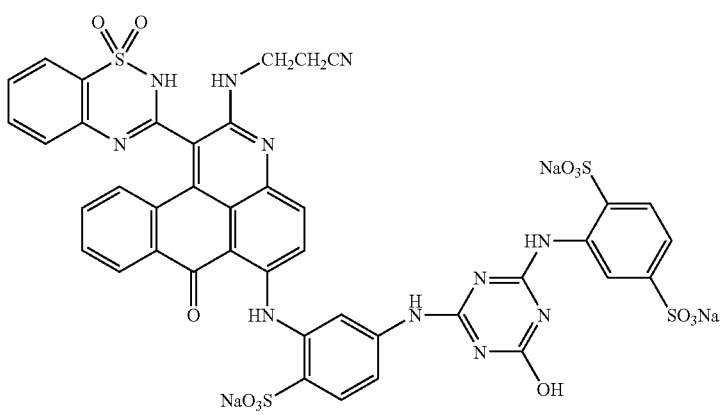

-continued
1-56
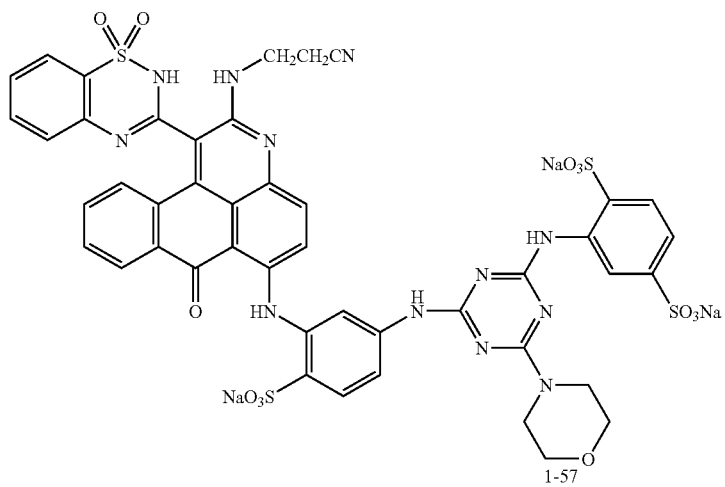
1-57
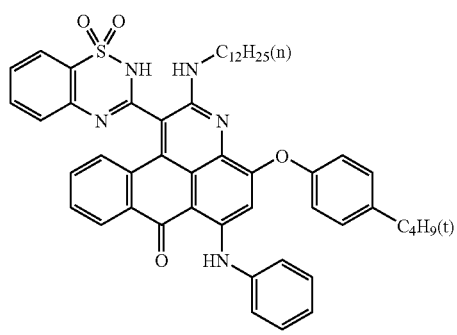
1-58
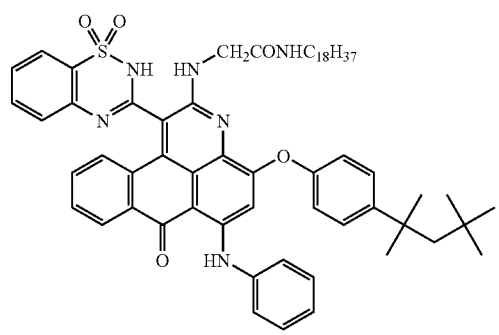
1-59
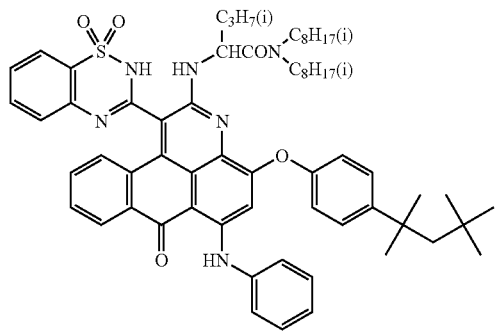
1-60
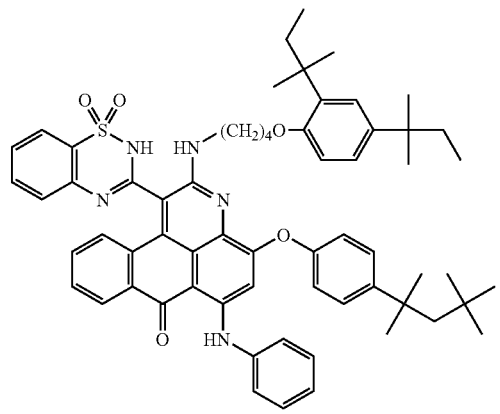
1-61
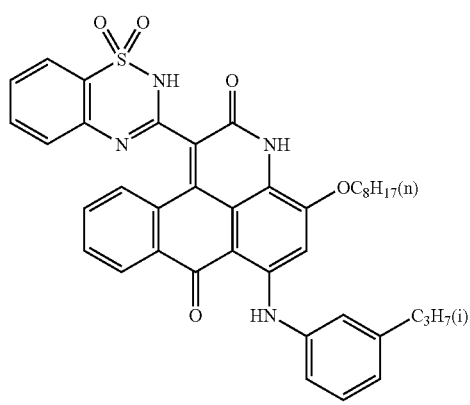

-continued
1-62
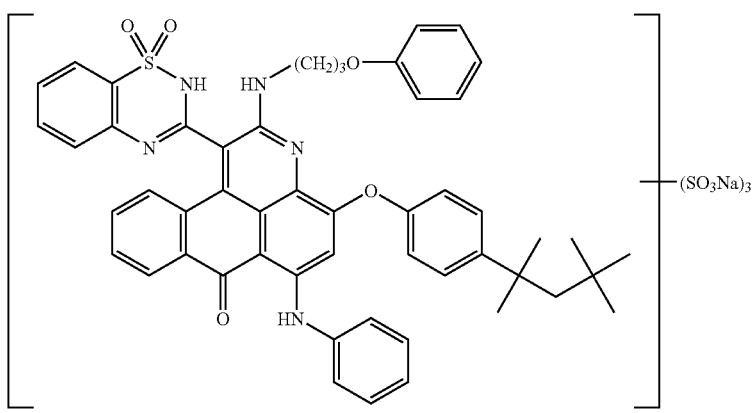
1-63
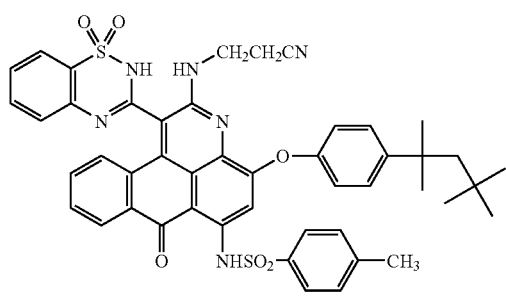
1-64
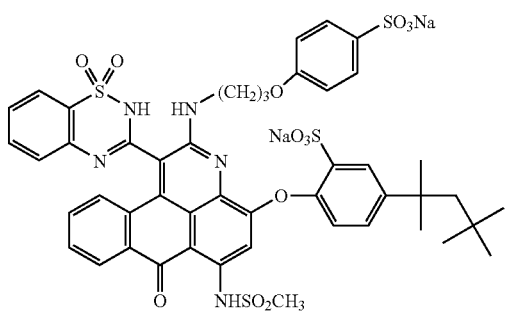
1-65
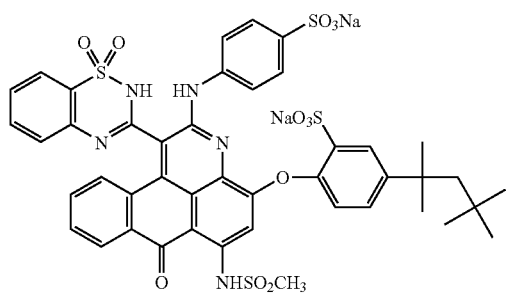
1-66
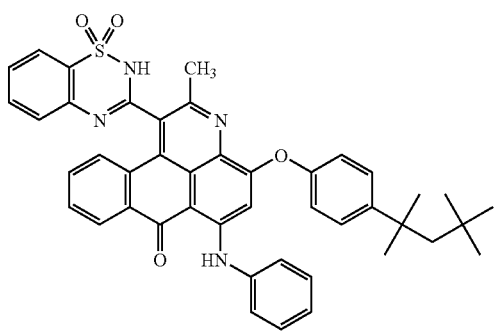
1-67
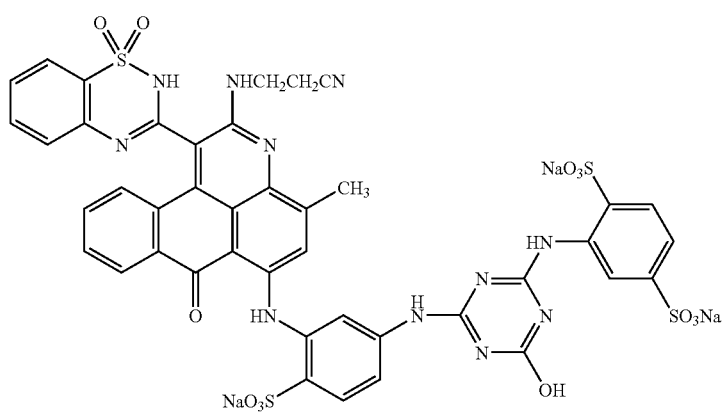

1-68
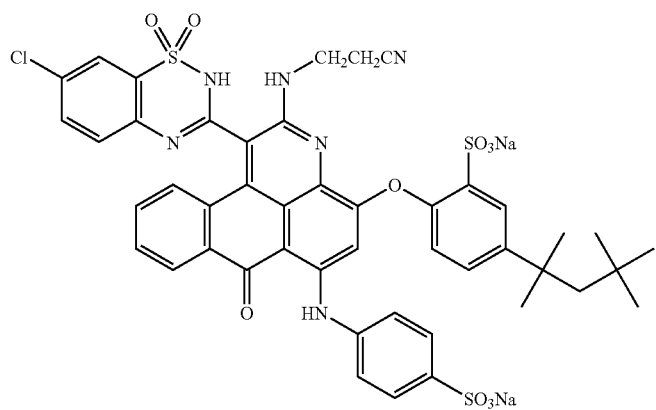
1-69
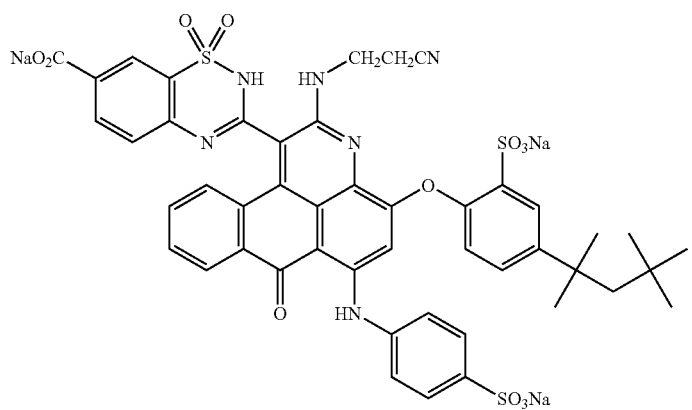
1-70
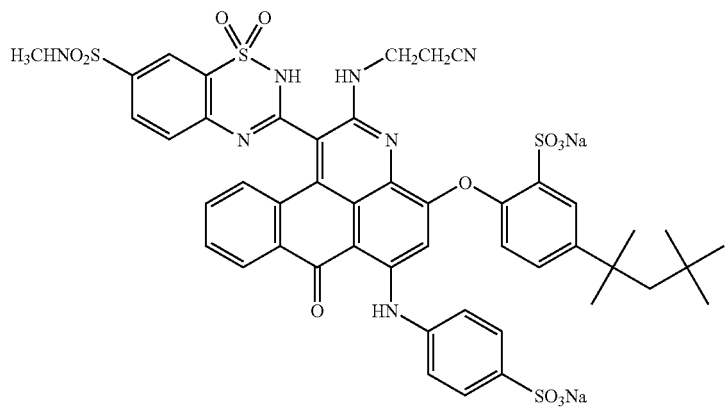

-continued
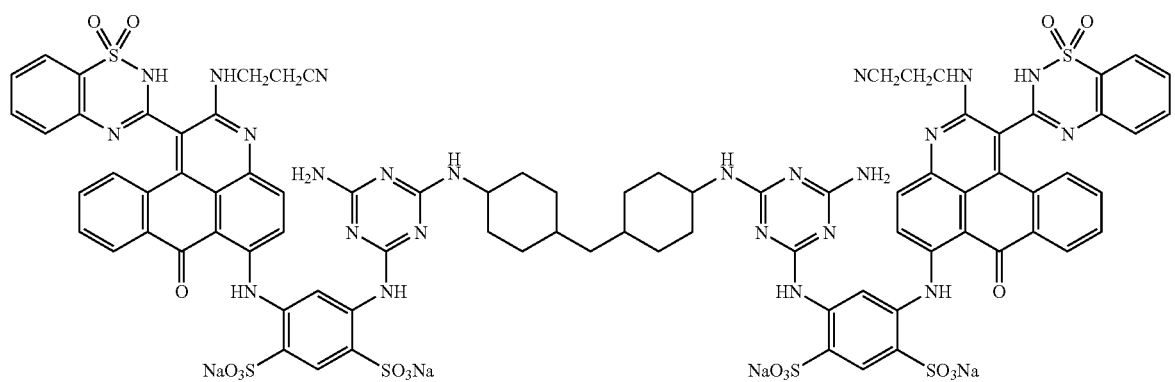
1-71
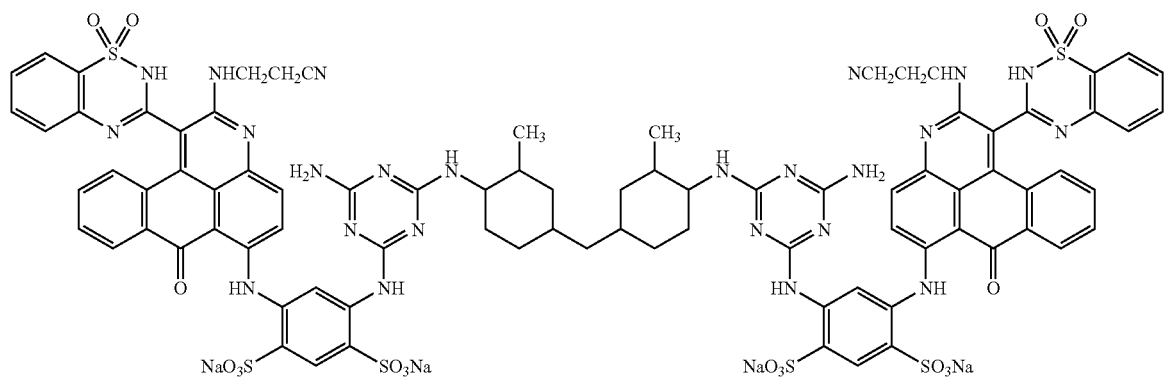
1-72
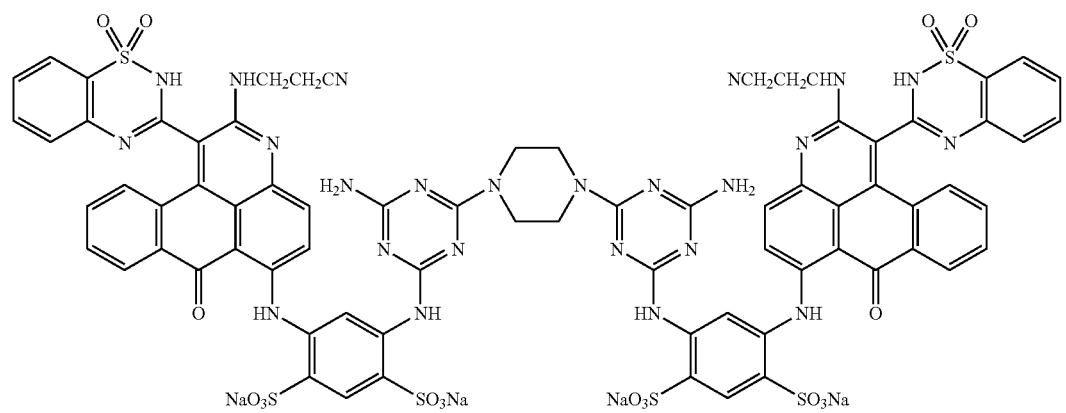
1-73

-continued
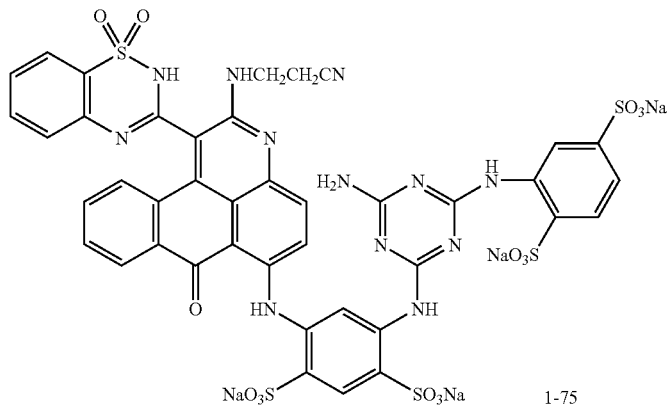
1-74
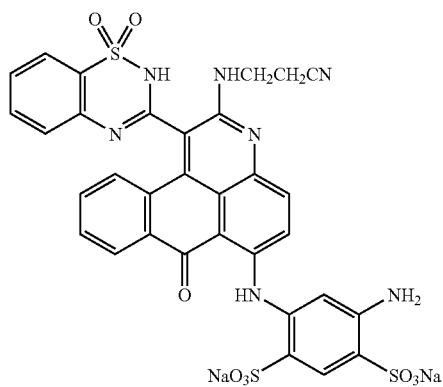
1-75
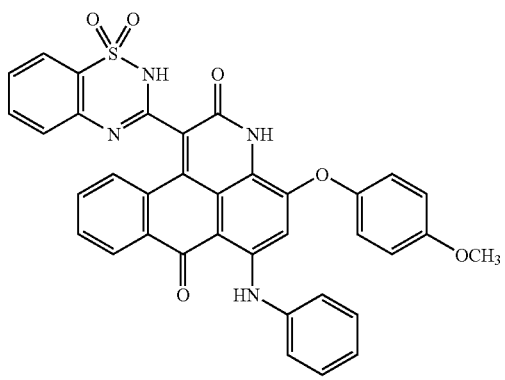
1-76
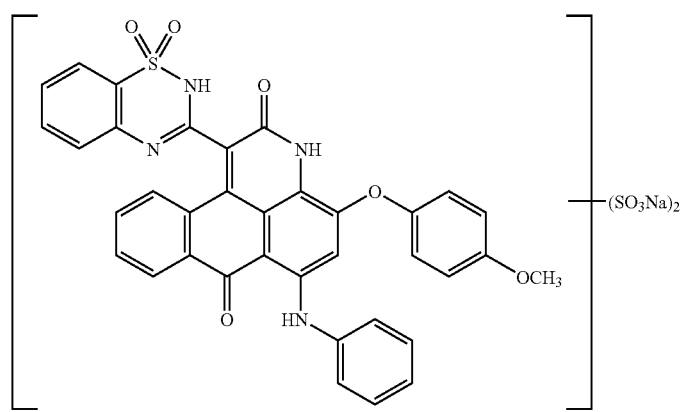
1-77
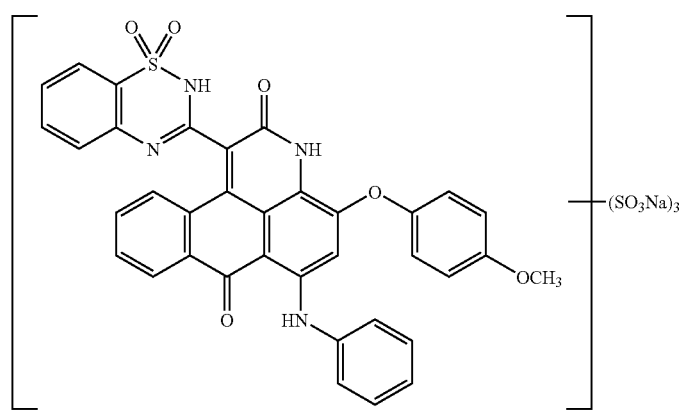
1-78

-continued
1-79
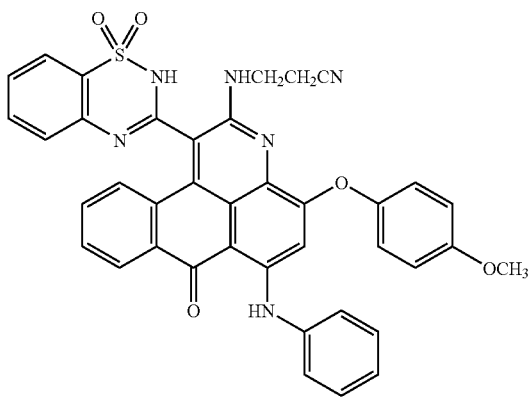
1-80
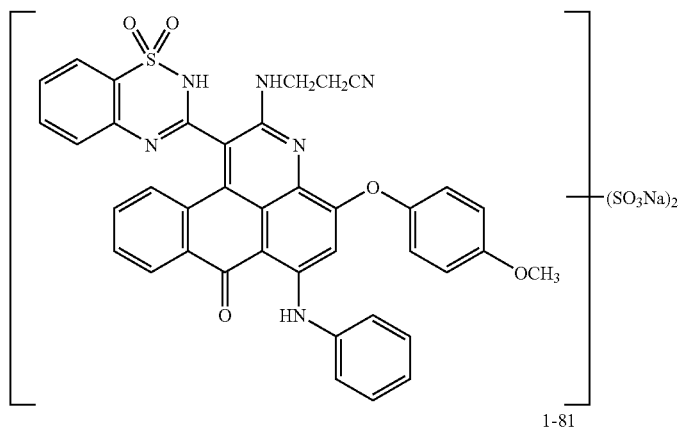
1-81
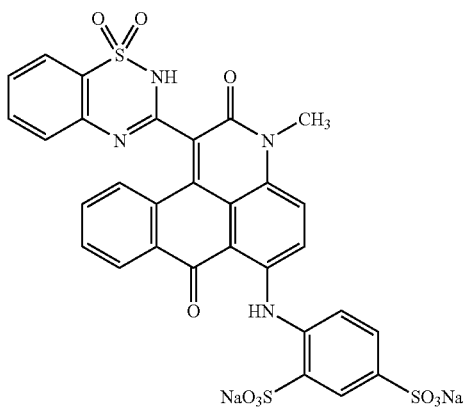
1-82
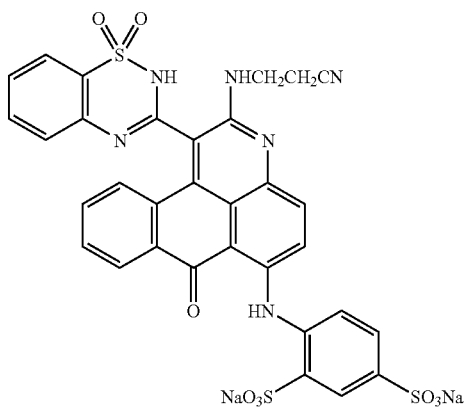
1-83
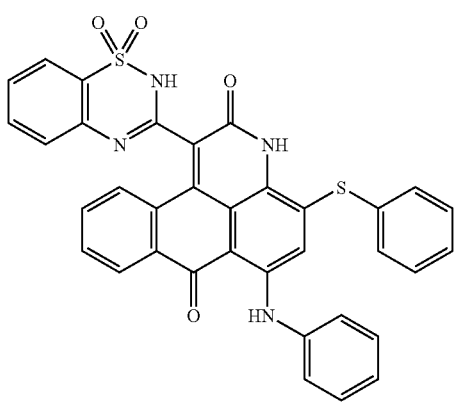
1-84
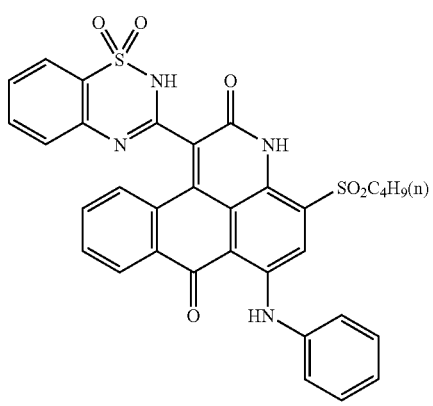

1-85

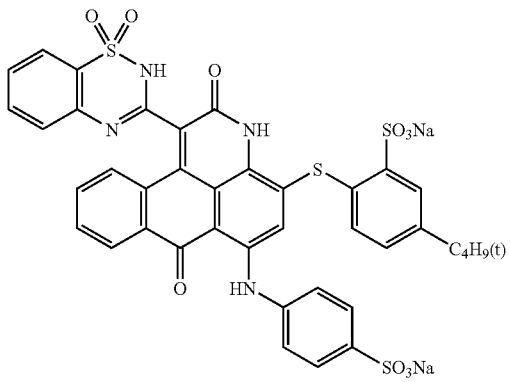

1-86

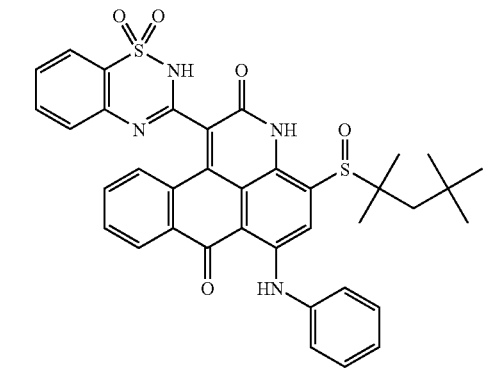

1-87

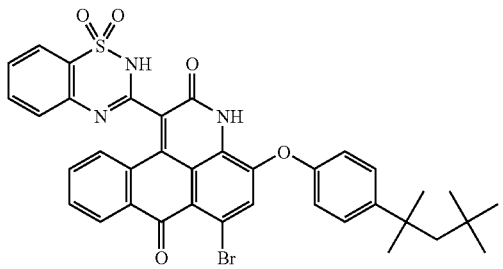

1-88

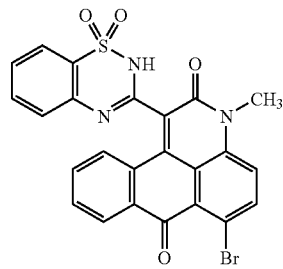

Dyes represented by the Formula (1)–(3) may be either water-soluble or oil-soluble, however, in the case of being oil-soluble, an inkjet recording liquid is preferably comprising said dyes being dispersed in a water-based medium. Specifically, said water-based medium at least includes water, or a mixture of water and a water miscible organic solvent appropriately added with additives such as a surfactant, an anti-drying agent (a wetting agent), a stabilizer and an antiseptic agent.

An inkjet recording liquid of this invention at least contains a dye of this invention as described in the above scope of claims and further may contain other arbitrary dyes, wherein preferable dyes can be easily selected in the corresponding industry.

A content of dyes represented by the Formula (1)–(3) in an inkjet recording liquid is preferably in a range of 0.1–25 weight % and more preferably of 0.5–10 weight %.

As a solvent of an inkjet recording liquid of this invention containing dyes represented by the Formula (1)–(3), utilized can be various types of solvent system such as a water-based solvent, an oil-based solvent and a solid (phase transformation) solvent, however specifically preferably utilized are water-based solvents described below with respect to preferably achieving the effects of this invention.

<Water-Based Solvent>

As a water-based solvent, utilized is a mixture system of water (preferably such as ion exchanged water) and a water-soluble organic solvent.

Examples of a water-soluble organic solvent include alcohols (such as methanol, ethanol, propanol, isopropanol, butanol, isobutanol, secondary butanol, tertiary butanol, pentanol, hexanol, cyclohexanol and benzyl alcohl), polyhydric alcohols (such as ethylene glycol, diethylene glycol, triethylene glycol, polyethylene glycol, propylene glycol, dipropylene glycol, polypropyrene glycol, butylene glycol, hexanediol, pentanediol, glycerin, hexanetriol and thioglycol), polyhydric alcohol ethers (such as ethylene glycol monomehtylether, ethylene glycol monoehtylether, ethylene glycol monobutylether, diethylene glycol monomehtylether, diethylene glycol monomehtylether, diethylene glycol monobutylether, propylene glycol monomehtylether, propylene glycol monobutylether, diethylene glycol monobutylether, ethylene glycol monomehtylether acetate, triethylene glycol monomethylether, triethylene glycol monoethylether, triethylene glycol monomphenylether and propylene glycol monophenylether), mines (such as ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine and tetramethylpropylenediamine), amides (such as formamide, N,N-dimethylformamide and N,N-dimethylacetoamide), heterocyclic rings (such as 2-pyrrolidone, N-methyl-2-pyrrolidone, cyclohexyl pyrrolidone, 2-oxazolidone and 1,3-dimethyl-2-imidazolidinone), sulfoxides (such as dimethylsulfoxide), sulfones (such as sulfolane), urea, acetonitrile and acetone. Among water-soluble organic solvents described above, polyhydric alcohols are specifically preferably utilized.

A water-based solvent can be utilized by dissolving a dye therein as it is, when dyes represented by the Formula (1)–(3) described above are soluble in the solvent system. In this case, the solubility of dyes represented by the Formula (1)–(3) in a water-based solvent is important, and structures of aforesaid dyes are characterized by preferably having at least one of a sulfo group or salts thereof (for example, alkali metal salts such as a sodium salt, a potassium salt, a ½ calcium salt or an ammonium salt) and more preferably having at least two or more of them.

<Micro-Particles Dispersion (Also Referred to as a Colored Particles Dispersion)>

Micro-particles dispersion of dyes represented by the Formula (1)–(3) according to this invention will now be explained.

In the case that a dye represented by the Formula (1)–(3) is essentially insoluble (herein, essentially insoluble indicates the case that the solubility into a water-based solvent is not more than 0.1 weight %) solid in a water-based solvent described above in a state of a dye alone, the aforesaid dye, together with a polymer dispersant or a surfactant, can be dispersed in a solvent system in which a dye alone is insoluble, after having been made into micro-particles by use of various homogenizers (such as a ball mill, a sand mill, an atliter, a roll mill, an agitator, a Henschel mixer, a colloidal mill, an ultrasonic homogenizer, a pearl mill, a jet mill and an ang-mill) or dissolved in an organic solvent in which the aforesaid dye is soluble.

Further, also listed are a method in which the aforesaid dye is kneaded with resin (also referred to as a polymer) followed by being dispersed in a water-based system, resulting in preparation of colored micro-particles dispersion in a state of said dye being covered with resin, and a method in which a solution of resin being dissolved in an organic solvent is added into a dispersion of the aforesaid dye, followed by elimination of the solvent under reduced pressure to perform resin-coat resulting in preparation of colored micro-particles dispersion.

Further, in the case that a solvent system is a solid form medium or a semi-fused form substance (a material like wax which will be described later) at such as room temperature, the aforesaid dye can be dispersed together with a polymer dispersant or a surfactant into the solvent system of a said solid form medium or a semi-fused form substance as it is or can be dispersed by dissolving said dye in an organic solvent which can dissolve said solvent system.

Micro-particles dispersion according to this invention contains micro-particles provided with at least one type of dyes represented by the Formula (1)–(3) and resin as constituent components, and preferably contains micro-particles having a core-shell structure.

Although it will be detailed later, a colored micro-particles dispersion in this invention is preferably constituted of resin having a relatively hydrophilic property at the micro-particles surface or the surface layer, with respect to improving stability of colored micro-particles as a water-based dispersion as well as preferably obtaining improvement effect of durability and tone of a colorant.

Further, it is preferable to make colored micro-particles (resinous dispersed particles containing a dye) as a core portion and to further form a shell portion comprising an organic polymer (provided with an oil-soluble property and being a water dispersion type polymer), to prevent aggregation of said colored micro-particles dispersion over a long period, to improve stability as an ink suspension of micro-particles, and to provide images with good tone or glossiness when being printed on a medium in addition to provide images with durability such as light fastness.

(Colored Micro-Particles Provided with Core/Shell Structure)

In the case that micro-particles constituting a micro-particles dispersion of this invention are provided with a core/shell structure, there are following combinations as a constitution of a core portion and a shell portion.

|  | Core portion | Shell portion |
|---|---|---|
| (1) | Dye | Resin |
| (2) | Dye + Resin | Resin |

Among above combinations, combination (2) constituted of a core portion containing resin and a dye, and a shell portion comprising resin is preferable with respect to improving dispersion stability of core/shell particles.

(Ratio of Resin to Form Core/Shell)

The amount of resin utilized in a shell is preferably in a range of 5–95 weight % and more preferably 10–90 weight %, based on the total resin amount, with respect to improving stability of a core/shell structure (preventing a part of a core from appearing on the particle surface or improving a dye protection property of a core portion).

(Ratio of Dye to Resin)

The weight of a dye is preferably in a range of 20–1000 weight % based on the total resin amount, with respect to sufficient function of dye protective ability of resin while keeping image density suitably after ink ejection.

(Particle Diameter of Micro-Particles)

In this invention, in the case that dyes represented by the Formula (1)–(3) described above are insoluble in a water-based solvent system and dispersed as micro-particles, the particle diameter of micro-particles (colored micro-particles) in the aforesaid micro-particles dispersion is preferably not more than 150 nm as a mean particle diameter.

Further, it is preferable to surely seal at least one type of dyes represented by the Formula (1)–(3) described above into a core shell resin, and to adjust a volume average particle diameter of core/shell micro-particles to a range of 1–200 nm and more preferably to a range of 3–100 nm, with respect to reducing liability to clogging of a head, preventing sedimentation of micro-particle dispersion in an inkjet recording liquid and improving storage stability (also referred to as standing stability or aging stability) of an inkjet recording liquid when the obtained micro-particles dispersion is utilized as ink.

(Volume Average Particle Diameter)

Herein, a volume average particle diameter of micro-particles can be determined by spherical conversion of an equivalent circle particle diameter obtained from a mean value of projection areas of transparent type electronmicroscopic photography (measured with respect to at least 100 particles). A volume average particle diameter and a standard deviation thereof are determined, and the standard deviation is divided by the volume average particles diameter to obtain a coefficient of variation. Further, a coefficient of variation is also determined by utilizing a dynamic light scattering method. For example, it can be determined by use of Laser Particle Diameter Analyzing System, produced by Otsuka Electronics Co., Ltd. or Zeta-Sizer, produced by Marburn Instruments Co., Ltd.

(Coefficient of Variation of Particle Diameter)

A coefficient of variation of a particle diameter is a value of a standard deviation divided by a particle diameter, and the larger is this value means that the wider is a distribution of a particle diameter.

A coefficient of variation of a particle diameter is preferably less than 80%, further preferably not more than 50% and specifically preferably not more than 30%, with respect to an effect of improving uniformity of a thickness of a core/shell and making the surface physical properties among particles homogeneous to decrease aggregation of particles, resulting in prevention of clogging of an inkjet head, as well as an effect of preventing undesired light scattering of colorant on a medium, resulting in depressing deterioration of image quality.

(Preparation Method of Core/Shell Structure)

Preparation methods of micro-particles provided with a core/shell structure according to this invention include a method in which a resin core containing a dye according to this invention is first prepared followed by a resin shell being provided, and a method in which a core and a shell are simultaneously prepared.

(a) Meathod to Provide Shell After Micro-Particles Core Preparation

Dye-containing resin (also referred to resin which contains a dye) to be a core can be prepared by various means.

For example, there is a method in which a dye and resin are mixed and kneaded, followed by being dispersed in a water system to prepare a resin-coated dye. Methods to provide the above dye-containing resin with a resin shell include a method in which a water-soluble resin dispersion is added to a water-based suspension of core-forming resin and is adsorbed thereon, a method in which a monomer is gradually added drop-wise and precipitated on the core surface simultaneously with polymerization, or a method in which resin dissolved in an organic solvent is gradually added drop-wise and is adsorbed on the core surface simultaneously with precipitation.

In this invention, specifically preferable is a method in which a monomer is gradually added drop-wise and is precipitated on the core surface simultaneously with polymerization.

(b) Method to Simultaneously Prepare Core and Shell at Micro-particle Formation

There are a method in which resin and a colorant (a dyestuff), which form a core, are dissolved or dispersed in a monomer which forms a shell after polymerization, followed by suspension polymerization in water, and a method the solution of resin and a colorant is emulsion polymerized while being added drop-wise into water containing a surfactant micelle. A monomer may become a core and resin may become a shell. There is also a method in which a dye is dissolved or dispersed in a mixed solution of a monomer to form a core and a monomer to form a shell after polymerization, and suspension polymerization or emulsion polymerization is performed.

(Evaluation Method of Core/Shell Structure)

It is important to evaluate whether colored micro-particles are actually made into a core/shell structure or not. In this invention, as described later, since each individual particle diameter of colored micro-particles is as small as not more than 200 nm, an analytical method is limited with respect to resolving power.

As an analytical method to meet such a purpose, a TEM (a transmission type electronmicroscope) and a TOF-SIMS (a time-of-flying type secondary ion mass spectrometer) can be applied. In the case of observing micro-particles having been made into a core/shell form through a TEM, they can be observed by coating the dispersion on a carbon holding membrane followed by drying. The observed image of a TEM may present a small contrast difference only depending on types of resin, therefore it is preferable to dye micro-particles by use of such as ruthenium tetraoxide, chlorosulfonic acid/uranyl acetate and silver sulfide to evaluate whether they are made into a core/shell form or not.

Micro-particles comprising only a core are dyed to be observed through a TEM, and which is compared with those further provided with a shell. Further, after mixing micro-particles further provided with a shell and those without a shell, the mixture was dyed and confirmed is whether a ratio of micro-particles having a different dyeing degree coincides a ratio of presence of a shell.

By a mass spectrometer such as a TOF-SIMS, an amount of colorant in the neighborhood of the surface is reduced by providing the particle surface with a shell, compared to that in the case of a core only. When an element, which is not contained in resin, presents in a colorant, it is possible to confirm that whether a shell having a smaller colorant content is provided or not by utilizing the element as a probe.

That is, as for a colorant content ratio (a concentration), first a total amount of ions having a mass number of 1–1000 is measured with respect to each micro-particles surface, and, among them, a ratio of a total amount of ions arising from an element, which is contained in a dye but not contained in core/shell resin, to the total amount is calculated. Then each colorant content ratio (a concentration) is compared for a shell and a core without a core/shell formation by this method, resulting in determination of each dye content ratio (a concentration).

Since a TOF-SIMS can perform elementary analysis at a few nm from the surface in the depth direction, analysis of core/shell micro-particles is possible.

Even in the case that no specific elements as described above present, it is possible to compare and study a colorant content in a shell with that of particles without a shell by utilizing a suitable dying agent.

Further, core/shell formation can be more clearly observed by a manner, in which a core/shell particle is buried in epoxy resin, followed by being cut with a microtome to prepare an ultra-thin slice and dyed. When there exists an element to be a probe in resin or a colorant, it is also possible to estimate a core/shell composition and a colorant distribution amount among a core and a shell by use of such as a TOF-SIMS and a TEM.

(Preferable Physical Properties of Resin for Forming Colored Micro-Particles Dispersion)

Physical properties required by resin for forming a colored micro-particles dispersion include a variety of properties such as, needless to say, strong compatibility or affinity with at least one type of dyes represented by the Formula (1)–(3) described above, strong mutual interaction to improve tone and storage stability, suitable hydrophobicity to maintain the dispersion system as well as suitable hydrophilicity to improve dispersion stability, in addition to, a high glass transition temperature (Tg) to enhance light fastness (however, a low Tg is preferred to improve dispersion stability).

In complex resin particles conventionally utilized together with colorants such as dyes and dyestuffs, for example, it is preferable to utilize resin provided with a strong compatibility or affinity with such as dyes and dyestuffs, with respect to obtaining colored micro-particles having an excellent tone. Utilized resin preferably has a number average molecular weight of 500–100,000 and specifically preferably 1,000–30,000.

As for a Tg of said resin utilized can be various types, however, at least one or more types of utilized resin preferably has a Tg of not lower than 10° C.

In this invention, all of resins commonly known can be utilized, however, specifically preferable are resin provided with an acetal group as a primary functional group, resin provide with a carbonic acid ester group, resin provided with a hydroxyl group and resin provided with an ester group. The above resins may be provided with substituents, and said substituents may have a straight chain, branched chain or cyclic structure. Further, resins provided with the above functional groups are available on the market, however, may also be synthesized by a conventional method. Further, these copolymers can also be prepared, for example, by introducing an epoxy group in one resin, followed by being condensation polymerized or by being graft polymerized employing light or radiation, with other resin.

In colored micro-particles dispersion according to this invention, a resin core contributes primarily includes a colorant to maintain the durability and tone, while a shell resin contributes to increase stability of micro-particles containing a colorant as an ink suspension as well as to promote fixing and to prevent aggregation of a colorant on a medium resulting in contributing image quality improvement. In addition to these, durability and keeping tone of a colorant are also improved.

A colorant content ratio (a concentration) can be measured by a mass spectrometer such as a TOF-SIMS as described above, and in a TOF-SIMS, first a total amount of ions having a mass number of 1–1000 is measured with respect to each micro-particles surface, and a colorant content ratio can be obtained from a ratio of a total amount of ions arising from a dye among them. Each colorant content ratio is compared for a shell and a core without a core/shell formation. Since a TOF-SIMS can perform elementary analysis at a few nm from the surface in the depth direction, analysis of core/shell micro-particles such as those of this invention is possible.

In micro-particles provided with a core/shell form according to this invention, a resin amount blended in water-based ink is preferably 0.5–50 weight % and more preferably 0.5–30 weight %, with respect to suitable protection ability of colorant, improvement of storage stability as suspension ink, prevention of viscosity increase due to ink evaporation at the top of an inkjet nozzle and prevention of clogging of a printer head due to aggregation of a suspension.

<Oil-Soluble Polymer (also Referred to as an Oleophilic Polymer)>

In an inkjet recording liquid of this invention, with respect to improving aging stability of a micro-particles dispersion (a colored particles dispersion) in ink utilizing a water-based solvent, preferred is an embodiment in which said micro-particles dispersion contains the aforesaid dye and an oil-soluble polymer.

Herein, an oil-soluble polymer preferably has a solubility to pure water of not more than 10 weight % under room temperature (at atmospheric pressure).

At the time of preparing micro-particles dispersion utilizing an oil-soluble polymer, utilizing form of said oil-soluble polymer include the forms of such as following (c) and (d).

(c) A case in which a micro-particles dispersion according to this invention is prepared in a state of said dye being impregnated in resin (a polymer)

(d) A case in which a micro-particles dispersion according to this invention is prepared as a dispersion of a core/shell particles comprising a core region (containing resin and a dye) and a shell region (containing resin) which is formed to cover said core region A preferable example of above embodiment (c) include one in which, after a dye represented by the Formula (1)–(3) described above having been dissolved in an organic solvent (also referred to as an oleophilic solvent) in which said dye is soluble, a micro-particle dispersion is prepared together with an oil-soluble polymer (also referred to as a hydrophobic polymer), and the resulting dispersion is further dispersed in a water-based solvent.

Next, a preferable example of above embodiment (d) include one in which, after a dye represented by the Formula (1)–(3) described above having been dissolved in an organic solvent (also referred to as an oleophilic solvent) in which said dye is soluble, core particles (containing an oleophilic polymer and a dye as constituent components) are prepared by dispersing the system together with an oil-soluble polymer (also referred to as a hydrophobic polymer), and further said core particles are covered with an oil-soluble polymer resulting in formation of a shell region.

Further, in preparation of a micro-particle dispersion of either of embodiments (c) and (d), a dispersion method of micro-particles in a water-based solvent can be referred to methods described in, for example, JP-A Nos. 5-148436, 5-295312, 7-97541, 7-82515 and 7-118584.

An oil-soluble polymer according to this invention is not specifically limited and can be appropriately selected depending on purposes, and any of conventionally well known polymers of a water-insoluble type, a water-dispersion (self-emulsifying) type and a water-soluble type can be utilized, however, among them, an oil-soluble polymer for forming a shell region utilized in the preparation of micro-particles dispersions of aforesaid embodiments (C) and (d) is preferably a water-dispersion type polymer described below; with respect to easy manufacturing and dispersion stability of a colored micro-particles dispersion.

<Water-Dispersion Type Polymer>

Water-dispersion type polymer is any of ion dissociation type, a nonionic-dispersing group containing type or a mixed type thereof. The aforesaid ion dissociation type polymer includes a polymer containing a cationic dissociating group such as a tertiary ammonium group and a polymer containing an anionic dissociating group such as carboxylic acid or sulfonic acid. The aforesaid nonionic-dispersing group containing polymer includes a polymer containing a nonionic-dispersing group such as a polyethyleneoxide chain.

Among these, preferable are an ion-dissociation type polymer provided with an anionic dissociating group, a nonionic-dispersing group containing type polymer and a mixed type polymer, with respect to dispersion stability of colored micro-particles.

Monomers (also referred to as monomeric substances) utilized for forming a water dispersion type polymer according to this invention, for example, include the following.

That is, listed are acrylic esters, specifically such as methylacrylate, ethylacrylate, n-propylacrylate, isopropylacrylate, n-butylacrylate, isobutylacrylate, sec-butylacrylate, tert-butylacrylate, amylacrylate, hexylacrylate, 2-ethylhexylacrylate, octylacrylate, tert-octylacrylate, 2-chloroethylacrylate, 2-bromoethylacrylate, 4-chlorobutylacrylate, cyanoethylacrylate, 2-acetoxyethylacrylate, benzylacrylate, methoxybenzylacrylate, 2-chlorohexylacrylate, cyclohexylacrylate, furfurylacrylate, tetrahydrofurfurylacrylate, phenylacrylate, 5-hydroxypentylacrylate, 2,2-dimethyl-3-hydroxypropylacrylate, 2-methoxyethylacrylate, 3-methoxybutylacrylate, 2-ethoxyethylacrylate, 2-butoxyethylacrylate, 2-(2-methoxyethoxy)ethylacrylate, 2-(2-butoxyethoxy)ethylacrylate, glycidyl acrylate, 1-bromo-2-methoxyethylacrylate, 1,1-dichloro-2-ethoxyethylacrylate, 2,2,2,2-tetrafluoroethylacrylate and 1H,1H,2H,2H-perfluorodecylacrylate; methacrylic acid esters, specifically such as methylmethacrylate, ethylmethacrylate, n-propylmethacrylate, isopropylmethacrylate, n-butylmethacrylate, isobutylmethacrylate, sec-butylmethacrylate, tert-butylmethacrylate, amylmethacrylate, hexylmethacrylate, cyclohexylmethacrylate, benzylmethacrylate, chlorobenzylmethacrylate, octylmethacrylate, stearylmethacrylate, 2-(3-phenylpropyloxy)ethylmethacrylate, furfurylmethacrylate, tetrahydrofurfurylmethacrylate, phenylmethacrylate, cresylmethacrylate, naphthylmethacrylate, 2-hydroxyethylmethacrylate, 4-hydroxybutylmethacrylate, triethyleneglycol monomethacrylate, dipropyleneglycol monomethacrylate, 2-methoxyethylmethacrylate, 3-methoxybutylmethacrylate, 2-ethoxyethylmethacrylate, 2-isopropoxyethylmethacrylate, 2-butoxyethylmethacrylate, 2-(2-methoxyethoxy)ethylmethacrylate, 2-(2-ethoxyethoxy)ethylmethacrylate, 2-(2-butoxyethoxy)ethylmethacrylate, 2-acetoxyethylmethacrylate, 2-acetoacetoxyethylmethacrylate, allylmethacrylate, glycidyl methacrylate, 2,2,2,2-tetrafluoroethylmethacrylate and 1H, 1H, 2H, 2H-perfluorodecylmethacrylate; vinyl esters, specifically such as vinyl acetate, vinyl propionate, vinyl butyrate, vinyl isobutyrate, vinyl caproate, vinyl chloroacetate, vinyl methoxyacetate, vinyl phenyacetate, vinyl benzoate and vinyl salicylate; acrylamides, specifically such as acrylamide, methylacrylamide, ethylacrylamide, propylacrylamide, butylacrylamide, tert-butylacrylamide, tert-octylacrylamide, cycrohexylacrylamide, benzyl acrylamide, hydroxymethylacrylamide, methoxymethylacrylamide, butoxymethylacrylamide, methoxyethylacrylamide, phenylacrylamide, dimethylacrylamide, diethylacryramide, β-cyanoethylacrylamide, N-(2-acetoacetoxyethyl)acrylamide and diacetoneacrylamide; methacrylamides, specifically such as methacrylamide, methylmethactylamide, ethylmethacrylamide, propylmethacrylamide, butylmethacrylamide, tert-butylmethacrylamide, cyclohexylmethacrylamide, benzylmethacrylamide, hydroxymethylmethacrylamide, methoxyethylmethacryamide, phenylmethacrylamide, dimethylmethacrylamide, β-cyanoethylmethacrylamide and N-(2-acetoacetoxyethyl) methacrylamide; olefins, specifically such as cyclopentadiene, ethylene, propylene, 1-butene, 1-pentene, vinyl chloride, vinylidene chloride, isoprene, chloroprene, butadiene and 2,3-dimethylbutadiene; styrenes, such as styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene and vinylbenzoic acid methyl ester; vinyl ethers, specifically such as methyl vinyl ether, butyl vinyl ether, hexyl vinyl ether and methoxyethyl vinyl ether; other monomers such as butyl crotonate, hexyl crotonate, dimethyl itaconate, dibutyl itaconate, diethyl maleate, dimethyl maleate, dibutyl maleate, diethyl fumarate, dimethyl fumarate, dibutyl fumarate, methyl vinyl ketone, phenyl vinyl ketone, methoxyethyl vinyl ketone, N-vinyl oxazolidone, N-vinyl pyrrolidone, vinilidene chloride, methylene malonitrile, vinilidene, diphenyl-2-acryloyl oxyethylphosphate, diphenyl-2-methacryloyl oxyethylphosphate, dibutyl-2-methacryloyl oxyethylphosphate and dioctyl-2-methacryloyl oxyethylphosphate.

Further, monomers provided with a dissociating group include monomers provided with an anionic dissociating group and monomers provided with a cationic dissociating group.

The aforesaid monomers provided with an anionic dissociating group include, for example, carboxylic acid monomers, sulfonic acid monomers and phosphoric acid monomers.

Carboxylic acid monomers include, for example, acrylic acid, methacrylic acid, itaconic acid, maleic acid, fumaric acid, citraconic acid, crotonic acid, monoalkyl itaconates (such as monomethyl itaconate, monoethyl itaconate and monobutyl itaconate) and monoalkyl maleate (such as monomethyl maleate, monoethyl maleate and monobutyl maleate).

Sulfonic acid monomers include, for example, styrene sulfonic acid, vinylsulfonic acid, acryloyl oxyalkylsulfonates (such as acryloyl oxymethylsulfonate, acryloyl oxyethylsulfonate and acryloyl oxypropylsulfonate), methacryloyl oxyalkylsulfonates (such as acryloyl oxymethylsulfonate, acryloyl oxyethylsulfonate and acryloyl oxypropylsulfonate), acrylamide alkylsulfonates (such as 2-acrylamide-2-methylethane sulfonate, 2-acrylamide-2-methylpropane sulfonate and 2-acrylamide-2-methylbutane sulfonate) and methacrylamide alkylsulfonates (such as 2-methacrylamide-2-methylethane sulfonate, 2-methacrylamide-2-methylpropane sulfonate and 2-methacrylamide-2-methylbutane sulfonate).

Phosphoric monomers include, for example, vinyl phosphonic acid and methacryloyl oxyethl phosphonate.

Among them, preferable are acrylic acid, methacrylic acid, styrene sulfonic acid, vinylsulfonic acid, acrylamide alkylsulfonates and methacrylamide alkylsulfonates, and more preferable are acrylic acid, methacrylic acid, styrene sulfonic acid, 2-acrylamide-2-methylpropanesulfonate and 2-acrylamide-2-methylbutanesulfonate.

The aforesaid monomers provided with a cationic dissociating group include, for example, monomers having a tertiary amino group such as dialkylaminoethyl methacrylates and dialkylaminoethyl acrylates.

Further, monomers provided with a nonionic dispersing group include, for example, an ester of polyethyleneglycol monoalkylether and a carboxylic acid monomer, an ester of polyethylene glycol monoalkylether and a sulfonic acid monomer, an ester of polyethylene glycol monoalkyl ether and a phosphoric acid monomer, urethanes containing a vinyl group formed from polyethylene glycol monoalkylether and a monomer provided with an isocyanate group, and macromonomers containing a polyvinyl alcohol structure. The number of a repeating unit in an ethyleneoxide portion of the aforesaid polyethylene glycol monoalkylether is preferably 8–50 and more preferably 10–30. The number of a carbon atom in an alkyl group of the aforesaid polyethylene glycol monoalkylether is preferably 1–20 and more preferably 1–12.

These monomers can be utilized alone as a single monomer to form polymer, or in combination of two or more types to form polymer, and can be suitably selected according to the purposes (such as Tg control, solubility improvement and dispersion stability) of the aforesaid polymer.

<Conventionally Well Known Polymers>

Further, conventionally well known polymers (resin) can be utilized as resin in this invention, and preferable polymers include a polymer provided with an acetal group as a primary functional group, a polymer provided with a carboxylic acid ester group, a polymer provided with a hydroxyl group and a polymer provided with an ester group, more preferably a polymer provided with an acetal group and specifically preferably polyvinyl butyral.

The above-described polymers may be provided with a substituents, and the substituents may be comprised of a straight chain, branched chain or cyclic structure. Further, polymers provided with the above described functional groups are available on the market in various types, however, can be also synthesized by a conventional method. Further, these copolymers can be prepared, for example, by introducing an epoxy group in one polymer molecule, followed by condensation polymerization or graft polymerization utilizing light or radiation, with other polymers.

Further, polymers prepared by radical polymerization of a vinyl monomer provided with an ehtylenic unsaturated double bond can be also preferably utilized. The examples include polymers prepared by radical polymerization of such as ethylene, propylene, butadiene, vinyl chloride, vinilidene chloride, vinyl acetate, styrene, (meth)acrylic acid esters, acrylic acid, methacrylic acid and acrylamides, for example, copolymers such as of styrene/ethylacrylate or butylacrylate copolymers such as of styrene/ethylhexylmethacrylate in adition to copolymers such as of styrene/ethylhexyl methacrylate/hydroxyethylacrylate.

In preparation of core/sell type colored micro-particles according to this invention, a specifically preferable polymer includes those provided with an acetal group (polyvinyl acetals), and polyvinyl butyral among them is preferred with respect to interaction such as solubility and compatibility with a colorant such as a dye, and one out of plural polymers utilized to form a core portion is preferably polyvinyl biutyral, in addition to this, at least one or more out of said polymers are preferably utilized by being mixed as resin different from polyvinyl butyral. Further, it is also possible to utilize same type of polyvinyl butyrals by mixing polymers having different mean polymerization degrees or molecular weight distributions.

(Molecular Weight of Resin)

A number average molecular weight of these resin (polymers) utilized in this invention is preferably 500–100,000 and specifically preferably 1,000–30,000, with respect to a film forming property after printing, durability thereof and a suspension forming property.

(Glass Transition Temperature (Tg) of Resin)

As a glass transition temperature of resin, various types can be utilized, however, at least one type of utilized polymers is preferably one having a Tg of not lower than 10° C.

(Oleophilic Solvents)

Organic solvents (oleophilic solvents) utilized in preparation of micro-particles dispersion according to this invention will now be explained.

In this invention, oleophilic indicates solvents having a Log P value of not less than 0.

Oleophilic solvents (also referred to as hydrophobic solvents) utilized in this invention specifically include alcohols (such as pentanol, heptanol, octanol, phenylethyl alcohol, phenylpropyl alcohol, furfuryl alcohol, anil alcohol, cetyl alcohol, oleyl alcohol and octadecyl alcohol), esters (such as ethylene glycol diacetate, ethylene glycol monomethylether acetate, diethylene glycol monomethylether acetate, propylene glycol diacetate, ethyl acetate, propyl acetate, butyl acetate, amyl acetate, benzyl acetate, phenyl ethyl acetate, phenoxy ethyl acetate, ethyl phenylacetate, benzyl propionate, ethyl benzoate, butyl benzoate, butyl laurate, isopropyl milistinate, triethyl phosphate, tributyl phosphate, tri(2-ethylhexyl)phosphate, triphenyl phosphate, tricresyl phosphate, diethyl phthalate, dibutyl phthalate, diundecyl phthalate, diethyl malonate, dipropyl malonate, diethyl diethymalonate, diethyl succinate, dibutyl succinate, diethyl glutarate, diethyl adipate, dipropyl adipate, dibutyl adipate, di(2-mthoxyethyl)adipate, diethyl sebacate, diethyl maleate, dibutyl maleate, dioctyl maleate, diethyl fumarate, dioctyl fumarate, 3-hexenyl cinnamate and tributyl citrate), ethers (such as butyl phenyl ether, benzyl ethyl ether and hexyl ether), ketones (such as benzyl methyl ketone, benzyl acetone, diacetone alcohol and cyclohexanone), hydrocarbons (such as prtroleum ether, petroleum benzyl, tetralin, decalin, tertiary-amylbenzene and dimethylnaphthalene) and amides (such as N,N-diethyldodecaneamide and N,N-dibutyldodecaneamide).

In this invention, the case of a high boiling point organic solvent having a boiling point of not lower than 150° C. being contained is one of preferable embodiments with respect to tone or dispersion stability.

A high boiling point organic solvent is contained at 1–1000 weight % and preferably at 10–400 weight % based on the aforesaid oil-soluble dye. High boiling point organic solvents can be utilized alone or in combination of two or more types.

A boiling point of a high boiling point organic solvent is necessary to be not lower than 150° C. and preferably not lower than 170° C. A dielectric constant of said high boiling point organic solvent is necessary to be 3–12 and preferably 4–10. Herein, dielectric constant represents specific inductive capacity at 25° C. against that in vacuo.

A high boiling point organic solvent can be utilized also in the dye dispersion as described above in which an oil-soluble dye is dispersed in a water-based medium. That is, the aforesaid dye dispersion is comprised of an embodiment in which the aforesaid oil-soluble dye dissolved in a high boiling point solvent is dispersed in a water-based medium.

Said high boiling organic solvents are not specifically limited and can be suitably selected according to purposes including, for example, compounds described in such as U.S. Pat. No. 2,322,027, and preferable are those of phosphoric acid esters, fatty acid esters, phthalic acid esters, benzoic acid esters, phenols and amide type compounds.

By utilizing the aforesaid high boiling point organic solvents, solubility of a dye into a polymer is improved, tone is further improved and an improvement effect of dispersion stability is also obtained.

These high boiling point organic solvents may be utilized alone or in combination of two or more types, and include, for example, combinations of tricresyl phosphate and dibutyl phthalate, of trioctyl phosphate and di(2-ethylhexyl) sebacate, and of dibutyl phthalate and poly(N-butylacrylamide).

In this invention, a low boiling point organic solvents (organic solvents having a boiling point of not higher than 150° C. (generally not higher than 30° C.) under ordinary pressure) can be utilized in combination with the aforesaid high boiling point organic solvents.

Oleophilic solvents as described above can be utilized either by dissolving the aforesaid dyes represented by the Formula (1)–(3) therein as they are, or by dispersing or dissolving dyes in combination with a resinous dispersant or a binder.

A specific preparation method of an oil-based solvent utilized for such an inkjet recording liquid can be referred to methods described in JP-A No. 3-231975 and Japanese Translated PCT Patent Publication No. 5-508883.

<Solid Solvents (Also Referred to as Phase Transformation Solvents)>

As a solid (phase transformation) solvent utilized in this invention is a phase transformation solvent which is a solid at room temperature as a solvent and a fused liquid when being ejected while being heated as an inkjet recording liquid.

These phase transformation solvents include natural wax (such as bees wax, carnauba wax, rice wax, wood wax, . . . oil, whale wax, candelilla wax, hydrous lanolin, montan wax, ozocerite, ceresine, paraffin wax, microcrystalline wax and petrolatum), polyethylene wax derivatives, hydrocarbon chlorides, organic acids (such as palmitic acid, stearic acid, behenic acid, tiglic acd, 2-acetonaphthone behenate, 12-hydroxy stearate and dihydroxy stearate), organic acid esters (such as esters of above-described organic acid with alcohols such as glycerin, diethylene glycol and ethylene glycol), alcohols (such as dodecanol, tetradecanol, hexadecanol, eichosanol, docosanol, tetracosanol, hexacosanol, octacosanol, dodecenol, myricyl alcohol, tetracenol, hexadecenol, eicocenol, docosenol, pinene glycol, hinokiol, butindiol, nonanediol, isophthalyl alcohol, mesicerin, terephthalyl alcohol, hexanediol, decanediol, dodecanediol, tetradecanediol, hexadecanediol, docosanediol, tetracosanediol, terebineol, phenyl glycerin, eicosanediol, octanediol, phenylpropyrene glycol, bisphenol A and paraalphacumyl phenol), ketones (such as benzoyl acetone, diacetobenzene, benzophenone, tricosanone, heptacosanone, heptatriacontanone, hentriacontanone, heptatriacontanone, stearone, laurone and dianisole), amides (such as oleic acid amide, lauric acid amide, stearic acid amide, ricinoleic acid amide, palmitic acid amide, tetrahydrofuroic acid amide, erucic acid amide, myricetic acid amide, 12-hydroxysteric acid amide, N-stearylerucic acid amide, N-oleylstearic acid amide, N,N'-ethylene bislauric acid amide, N,N'-ethylene bisstearic acid amide, N,N'-ethylanebisoleic acid amide, N-N'-methylene bisstearic amide, N,N'-ethylene bisbehenic acid amide, N,N'-xylene bisstearic acid amide, N,N'-butylene bisstearic acid amide, N,N'-dioleyladipiic acid amide, N,N'-distearyladipic acid amide, N,N-dioleylsebacic acid amide, N,N'-distearylsebacic acid amide, N,N'-distearylterephthalic acid amide, N,N'-distearylisophthalic acid amide, phenacetin, toluamide, acetoamide, reaction products of a dimeric acid, a diamine and a fatty acid such as oleic acid dimer/ethylenediamine/stearic acid (a mol ratio of 1/2/2)), sulfonamides (such as p-toluenesulfonamide, ethylbenzene sulfonamide and butylbenzene sulfonamide), silicones (such as Silicone SH6018 (Toray Silicone Co., Ltd.) and Silicone KR215, 216, 220 (Shin-Etsu Silicone Co., Ltd.)), cumarones (such as Escurone G-90 (Shin-Nittetsu Chemicals Co., Ltd.)), cholesterol fatty acid esters (such as cholesterol stearate, cholesterol palmitate, cholesterol myricetate, cholesterol behenate, cholesterol laurate and cholesterol melissinate), saccharide fatty acid esters (such as saccharose stearate, saccharose palmitate, saccharose behenate, saccharose laurate, saccharose melissinate, lactose stearate, lactose palmitate, lactose myricetate, lactose behenate, lactose laurate and lactose melissinate).

A phase transformation temperature in solid-liquid transformation of a solid (phase transformation) solvent is preferably 60–200° C. and more preferably 80–150° C.

Solid solvents as described above can be utilized either by dissolving dyes of this invention as they are into said solvent being heated and fused, or by dispersing or dissolving said dyes in combination with a resinous dispersant or a binder.

Specific preparation methods of the above-described phase transformation solvents can be referred to methods described in JP-A Nos. 5-186723 and 7-70490.

An inkjet recording liquid of this invention in which a dye of this invention is dissolved by utilizing a water-based, oil-based or solid (phase transformation) solvent preferably has a viscosity at the time of flying of not more than $40 \times 10^{-3}$ Pa·s and more preferably not more than $30 \times 10^{-3}$ Pa·s.

Further, an inkjet recording liquid of this invention preferably has a surface tension at the time of flying of $20 \times 10^{-5}$ N/cm–$100 \times 10^{-5}$ N/cm and more preferably $30 \times 10^{-5}$ N/cm–$80 \times 10^{-5}$ N/cm.

A resinous dispersant utilized in this invention preferably a polymer compound having a molecular weight of 1,000–1,000,000, and in the case of utilizing them, the content thereof in an inkjet recording liquid is preferably 0.1–50 weight %.

In an inkjet recording liquid of this invention, added may be such as a viscosity controlling agent, a surface tension controlling agent, a specific resistance controlling agent, a film forming agent, a dispersant, a surfactant a UV absorbent, an anti-oxidant, an anti-fading agent, an anti-mold agent and an anti-stain agent, depending on purposes of improving ejection stability, adoptability to a print head or an ink cartridge, storage stability, image storage staility and various other performance.

An inkjet recording liquid of this invention is not specifically limited with respect to an employed recording method, however, can be specifically preferably utilized as an inkjet recording liquid for an on-demand mode inkjet printer. Specific examples of an on-demand mode method include an electromechanical conversion method (such as a single cavity type, a double cavity type, a vender type, a piston type, a share mode type and a sheered wall type), an electro-thermal conversion method (such as thermal inkjet type and a bubble jet (R) type), an electrostatic suction method (such as electric field control type and a slit jet type) and a discharge method (such as a spark jet type).

Herein, dyes represented by the Formula (1)–(3) are utilized in a color copier applying electrophotography, toners in a color laser printer, color filters utilized in displays such as a LCD and a PDP and in an image pick-up element such as a CCD, and an ink sheet utilized in a optical recording medium or a thermal transfer recording medium, in addition to being utilized in above-described inkjet recording liquid.

EXAMPLES

In the following, this invention will be explained referring to examples, however, this invention is not limited thereto.

Example 1

(Synthesis of Exemplary Compound 1-1)

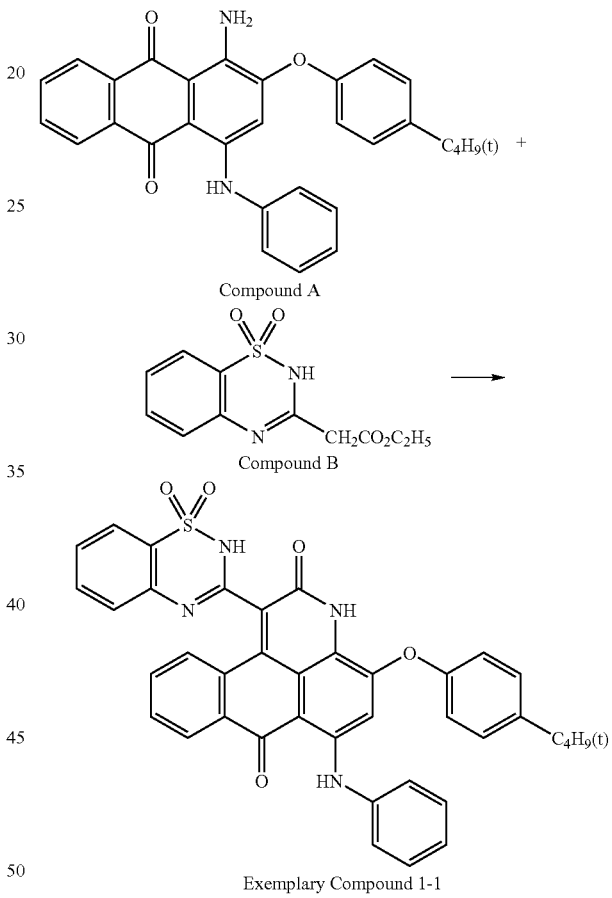

Compound A of 4.63 g, 4.02 g of compound B and 0.1 g of sodium carbonate were added into 50 ml of orthodichlorobenzene, and the system was heated at approximately 170° C. to be reacted for 3 hours while distillation eliminating formed ethanol and water. After finishing the reaction, orthodichlorobenzene was eliminated under reduced pressure, and then the obtained residue was purified by means of column chromatography (silica gel, developing solvent: ethyl acetate/toluene) resulting in obtaining 5.02 g of a red colored solid.

The analytical result of the obtained solid by means of $^1$H-NMR was as follows to confirm said solid to be exemplary compound 1-1.

$^1$H-NMR (400 MHs, heavy hydrogenated dimethylsulfoxide, δ (ppm)): 1.34 (s, 9H), 6.85 (s, 1H), 7.13 (m, 1H), 7.23 (dd, 2H), 7.27–7.36 (m, 4H), 7.41 (dd, 1H), 7.49 (dd, 2H), 7.59 (m, 1H), 7.67 (m, 1H), 7.76–7.84 (m, 2H), 7.97 (m, 1H), 8.09 (dd, 1H), 8.57 (dd, 1H), 12.94 (s, 1H)

Herein, compound B utilized in example 1 described above was synthesized as follows.

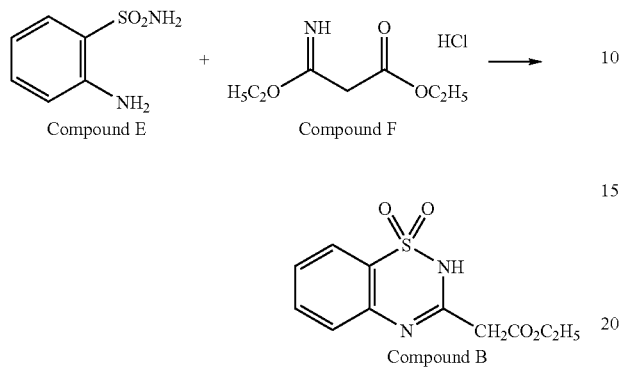

Compound E of 20 g and 68 g of compound F were added into 90 ml of ethanol and the system was refluxed while being heated for 5 hours. Thereafter, ethanol was distillation eliminated under reduced pressure, and the resulting system was added with 90 ml of xylene and refluxed while being heated for 4 hours. After finishing the reaction, the system was cooled and added with water to sufficiently disperse a solid. The resulting product was filtered and the obtained solid was recrystallized with methanol resulting in preparation of 25 g of compound B.

Obtained exemplary compound 1-1 of 0.2 g, 2.0 g of tricresyl phosphate and 0.16 g sodium dodecylbenzenesulfonate were dissolved in 1.3 of ethyl acetate. Next, said solution was added into a solution in which 6.8 g of 15% aqueous solution of lime-processed gelatin and 5.5 g of water were homogeneously mixed at 40° C., and the resulting solution was emulsifying dispersed for 10 minutes by use of a homogenizer at 40° C. at 10000 rpm. The resulting emulsified dispersion was added with water so as to make a concentration of exemplary compound 1-1 of 0.25 mmol/m², and this was coated on a print paper support by use of a wire bar. The film prepared after coating exhibited an excellent magenta color.

Example 2

(Synthesis of Exemplary Compound 1-48)

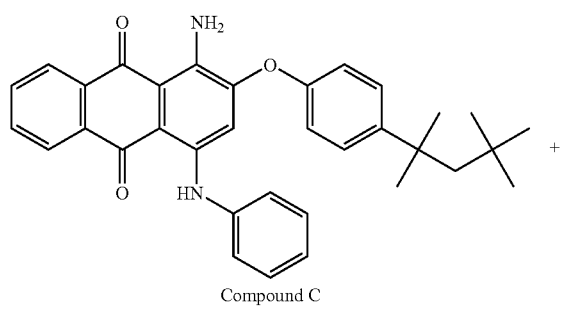

Compound C

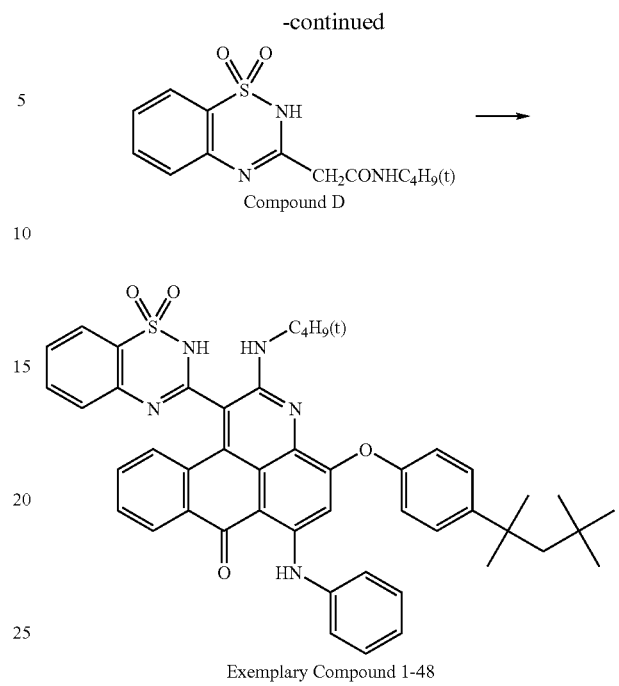

Exemplary Compound 1-48

Compound C of 5.0 g, 7.1 g of compound D and 3.0 g of oxychloro phosphate were added into 50 ml of toluene, and the system was heated at approximately 50° C. to be reacted for 8 hours. After finishing the reaction, the system was cooled and stirred with addition of water, followed by being dispersed. Then, the product was washed successively with 5% sodium hydrogen carbonate aqueous solution, sodium chloride aqueous solution and water. The organic layer was dried with anhydrous magnesium sulfate, and then dried under reduced pressure. The obtained residue was purified by means of column chromatography (silica gel, developing solvent: ethyl acetate/toluene) resulting in obtaining 5.2 g of exemplary compound 1-48.

The analytical result of the obtained solid by means of ¹H-NMR was as follows to confirm said solid to be exemplary compound 1-48.

¹H-NMR (400 MHs, heavy hydrogenated dimethylsulfoxide, δ(ppm)): 0.62 (s, 9H), 1.34 (s, 6H), 1.73 (s, 2H), 3.30 (s, 9H), 5.88 (s, 1H), 7.00 (s, 1H), 7.13 (m, 1H), 7.23 (dd, 2H), 7.27–7.36 (m, 4H), 7.41 (dd, 1H), 7.49 (dd, 2H), 7.59 (m, 1H), 7.67 (m, 1H), 7.76–7.84 (m, 2H), 7.97 (m, 1H), 8.09 (dd, 1H), 8.57 (dd, 1H), 12.91 (s, 1H)

Herein, compound D utilized in example 2 described above was synthesized as follows.

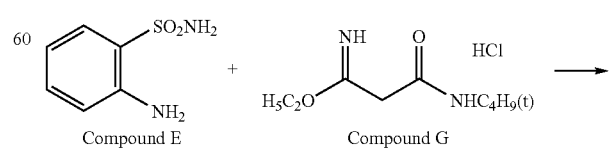

-continued

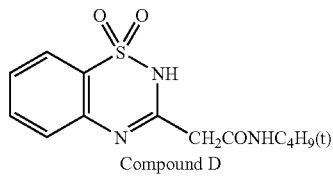
Compound D

Compound E of 20 g and 17 g of compound G were added into 90 ml of ethanol and the system was refluxed while being heated for 1 hour. The system further added with 60 g of compound G dividing into three parts, at every 30 minutes, and refluxed with heating for 4 hours. The resulting system was added with 90 ml of xylene and refluxed with heating for 4 hours while ethanol was distillation eliminated under reduced pressure. After finishing the reaction, the system was cooled and added with water to sufficiently disperse a solid. The resulting product was filtered and the obtained solid was recrystallized with methanol resulting in preparation of 23 g of compound D.

Obtained exemplary compound 1-48 of 0.2 g, 2.0 g of tricresyl phosphate and 0.16 g sodium dodecylbenzenesulfonate were dissolved in 1.3 of ethyl acetate. Next, said solution was added into a solution in which 6.8 g of 15% aqueous solution of lime-processed gelatin and 5.5 g of water were homogeneously mixed at 40° C., and the resulting solution was emulsifying dispersed for 10 minutes by use of a homogenizer at 40° C. and 10000 rpm. The resulting emulsified dispersion was added with water so as to make a concentration of exemplary compound 1-48 48 of 0.25 mmol/m², and this was coated on a print paper support by use of a wire bar. The film prepared after coating exhibited an excellent magenta color.

Example 3

<Preparation of Inkjet Recording Liquids 1–6: Water-Based Ink>

The compounds described in Table 1 were weighted so as to make a concentration in the finished ink of 2 weight %, and 15 weight % of ethylene glycol, 15 weight % of glycerin, 0.3 weight % Surfinol 465 (manufactured by Nisshin Chemicals Industry Co., Ltd.) and pure water of an adjusted amount to be the rest were added thereto. Then the system was mixed and dispersed, followed by being filtered through a 2 μm membrane filter to eliminate dust and coarse particles resulting in preparation of inkjet ink recording liquids 1– 6. The chemical structures of utilized comparative compounds are shown below.

[Chemical Structure 28]

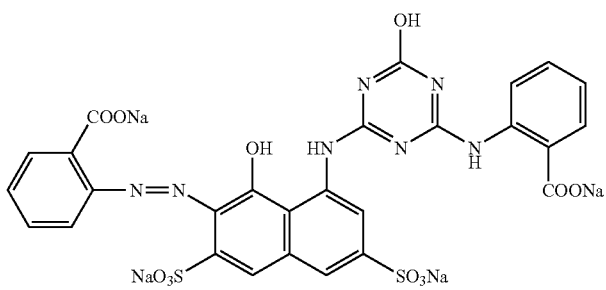

Comparative Compund 1

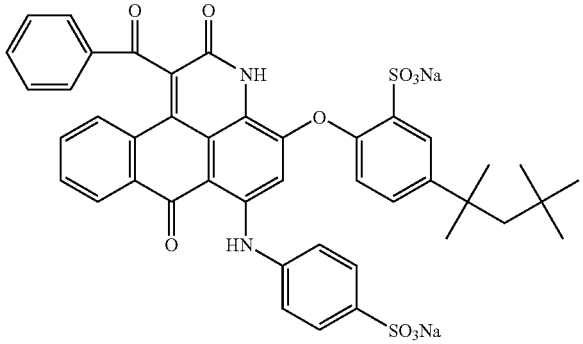

Comparative Compund 2

-continued

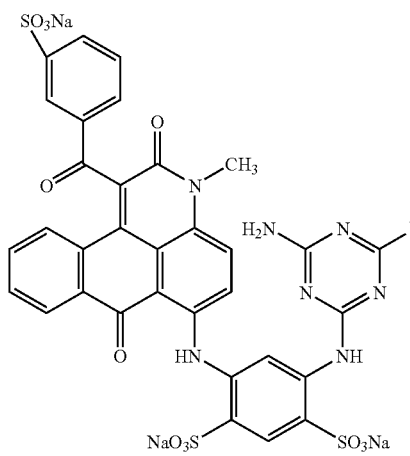

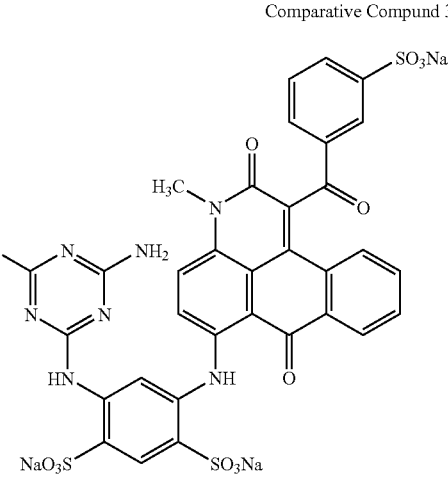

Comparative Compund 3

<Preparation and Evaluation of Image Samples>

Each ink of inkjet ink recording liquids 1–6 was printed on Konica Photo Jet Paper Photolike QP Glossy Paper (manufactured by Konica Minolta Photo Imaging, Inc.) by use of Inkjet Printer (produced by Epson Inc.) available on the market, resulting in preparation of image samples 1–6, with respect to which performed were evaluations of light fastness of images, tone of images and storage stability of ink, as described below.

<Light Fastness Evaluation of Image>

Prepared samples were irradiated by a xenon fade meter for 48 hours and light fastness of each image was evaluated based on the residual ratio of a dye. Herein, residual ratio of a dye (%) is represented by the following equation when a density before light irradiation is D0 and that of after light irradiation is D.

Light fastness=$D/D0 \times 100$ (%)

wherein, density was measured by use of Densitometer PDA-65, produced by Konica Minolta Photo Imaging, Inc.

<Tone Evaluation of Image>

Reflection spectra of image samples in a range of 390–730 nm at intervals of 10 nm were measured, and a* and B* were calculated based on CIE L*a*b* chromaticity diagram system.

Preferable tone as magenta is defined as below, and ranking was made based on the following three rank evaluation criteria. Herein, preferable values are not less than 76 for a* and in a range of −30–0 for b*.

A: a* and b* are both in a preferable range.

B: Only one of a* or b* is in a preferable range.

C: Both a* and b* are out of a preferable range.

<Storage Stability Evaluation of Ink>

After inkjet recording liquids 1–6 were stored in a sealed glass bottle at 80° C. for 1 week, images were formed in a similar manner to preparation of the aforesaid image sample and presence of abnormal ejection was observed during continuous ejection of 500 hours. Further, tone evaluation with respect to said images was performed in a similar manner to the above case, and storage stability was evaluated based on the following evaluation criteria.

A: There observed no abnormal behavior during continuous ejection, and tone shift from ink before storage is less than ±10 for both a* and b*.

B: There observed some abnormal behavior during continuous ejection, and tone shift from ink before storage is not less than 10 as an absolute value for at least either one of a* and b*.

The obtained results are shown in Table 1.

TABLE 1

| Image sample No. | Inkjet recording liquid No. | | Evaluation of image | | | Remarks |
|---|---|---|---|---|---|---|
| | No. | Compound | Storage stability | Light fastness | Tone | |
| 1 | 1 | Comparative compound 1 | A | 59 | A | Comparative |
| 2 | 2 | Comparative compound 1 | A | 72 | B | Comparative |
| 3 | 3 | Comparative compound 1 | A | 78 | B | Comparative |
| 4 | 4 | 1–3 | A | 85 | A | Invention |
| 5 | 5 | 1–41 | A | 86 | A | Invention |
| 6 | 6 | 1–52 | A | 81 | A | Invention |

It is clear from Table 1 that image samples of this invention, compared to comparative image samples, is superior in both light fastness and tone of images, in addition to that ink storage stability of ink of this invention is excellent.

Example 4

<Preparation of Micro-Particles Dispersion>

Zirconia beads, having a mean particle diameter of 0.5 mm, of 250 g were added into a mixed solution 10 g of a compound described in Table 2, 20 g of methyl ethyl ketone, 5 g of glycerin, 6 g of a copolymer (a neutralized polymer, having a copolymerization ratio of styrene/acrylic acid/2-hydroxyethyl methacrylate=80/5/15) and 40 g of ion-exchanged water and the system was dispersed for 4 hours by use of a media homogenizer (System Zeta, produced by Ashizawa Co., Ltd.). After finishing dispersion, a dispersion was obtained by filtering out zirconia beads from the resulting system. After this dispersion was diluted by adding 40 ml of water, methyl ethyl ketone was eliminated by distillation under reduced pressure resulting in preparation of micro-particles dispersion.

<Preparation of Inkjet Recording Liquids 7–12: Water-Based Ink>

The above-described micro-particles dispersion was weighted so as to make a concentration of the compound described in Table 2 in a finished inkjet recording liquid of 3 weight %, and 15 weight % of ethylene glycol, 15 weight % of glycerin, 3 weight % of triethylene glycol monobutylether, 0.3 weight % Surfinol 465 and pure water of an amount to be the rest were added thereto. Then the system was mixed and dispersed, followed by being filtered through a 2 μm membrane filter to eliminate dust and coarse particles resulting in preparation of inkjet ink recording liquids 7–12, as described in Table 2.

<Storage Stability Evaluation of Inkjet Recording Liquids 7–12: Variation Ratio of Particle Diameter, Filtration Property>

With respect to inkjet recording liquids 1–12, a variation ratio of the mean particle diameter when the liquid was stored at 60° C. for 7 days and a filtration property of ink after storage were evaluated as follows.

(Variation Ratio of Mean Particle Diameter of Ink)

Inkjet recording liquids 7–12 each were stored at 60° C. for 7 days and a mean particle diameter was determined by use of Laser Particle Diameter Analyzing System, manufactured by Otsuka Electronics Co., Ltd., and a variation ratio relative to a mean particle diameter of ink in the case without a storage test was determined by the following equation, which was ranked based on the criteria described below.

A variation ratio of a mean particle diameter (%)=[(a mean particle diameter of ink after storage)/(a mean particle diameter of ink without storage)]×100

C: not less than 10% (unusable in practice)
B: not less than 5% and less than 10% (usable in practice)
A: less than 5%

(Evaluation of Filtration Property of Ink)

After inkjet recording liquids 7–12 were stored at 60° C. for 7 days, 5 ml of which were sampled and filtered through a 0.8 μm cellulose acetate membrane filter and ranking evaluation was performed as follows.

A: The whole volume could be filtered.
B: Not less than a half volume could be filtered (usable in practice).
C: Less than a half volume could be filtered (unusable in practice).

In this invention, A and B are usable in practice.

<Preparation of Images and Tone Evaluation>

Image samples 7–12 were prepared by utilizing each ink comprising inkjet recording liquids 7–12 in a similar manner to example 3, and tone of an image was evaluated.

The results are shown in Table 2.

TABLE 2

| Image sample No. | Inkjet recording liquid No. | | Filtration property | Variation rate of particle diameter | Tone | Remarks |
|---|---|---|---|---|---|---|
| | No. | Compound | | | | |
| 7 | 7 | Comparative compound 4 | B | B | B | Comparative |
| 8 | 8 | Comparative compound 5 | B | C | A | Comparative |
| 9 | 9 | 1–1 | A | B | A | Invention |
| 10 | 10 | 1–14 | A | B | A | Invention |
| 11 | 11 | 1–48 | A | B | A | Invention |
| 12 | 12 | 1–58 | A | B | A | Invention |

[Chemical Structure 29]

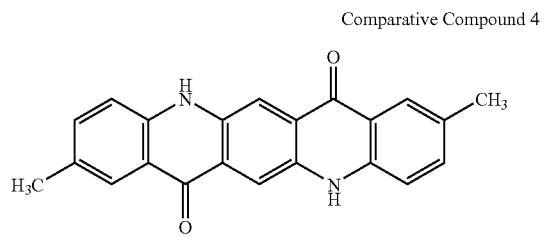

Comparative Compound 4

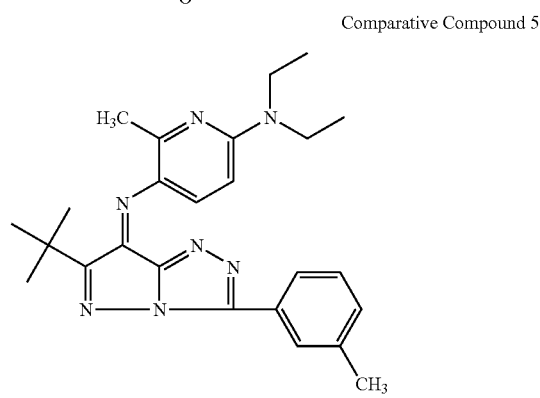

Comparative Compound 5

It is clear from Table 2 that ink of this invention is superior in a variation ratio of a mean particle diameter of ink after storage and a filtration property of ink, in addition to that tone of an image of image samples prepared utilizing ink of this invention is excellent.

Example 5

<Preparation of Micro-Particles Dispersion>: Particles Comprising Core/Shell Structure A compound shown in Table 3 of 5 g, 5 g of polyvinyl butyral (BL-S, manufactured by Sekisui Chemicals Co., Ltd., a mean polymerization degree of 350) and 50 g of ethyl acetate were charged in a separable flask, the inside of which was replaced by a $N_2$ gas, and the system was stirred to completely dissolve said polyvinyl butyral and the compounds.

After an aqueous solution containing 2 g of sodium laurylsulfate were added drop-wise to the resulting solution, said solution was emulsified for 300 seconds by use of a ultrasonic homogenizer (UH-150 Type, SMT Co., Ld.). Thereafter, ethyl acetate was eliminated under reduced pressure resulting in preparation of a core micro-particles dispersion (also referred to as a core micro-particles dispersion) in which the aforesaid compound is immersed in the aforesaid polyvinyl butyral.

Potassium persulfate of 0.15 g was added and dissolved into the obtained core micro-particles dispersion, after which was heated at 70° C. by attaching a heater, and the dispersion was further reacted for 7 hours while being added drop-wise with a mixed solution of 2 g of styrene and 1 g of 2-hydroxyethyl methacrylate, to form a shell polymer layer on the core micro-particles, resulting in preparation of a colored micro-particles dispersion.

<Preparation of Inkjet Recording Liquids 14–18: Water-Based Ink>

The above-described colored micro-particles were weighted so as to make a concentration in the finished ink of 2 weight %, and 15 weight % of ethylene glycol, 15 weight % of glycerin, 3 weight % of triethylene glycol monobutylether, 0.3 weight % Surfinol 465 and pure water of an adjusted amount to be rest were added thereto. Then the system was mixed and dispersed, followed by being filtered through a 2 μm membrane filter to eliminate dust and coarse particles resulting in preparation of inkjet ink recording liquids 14–18.

<Storage Stability Evaluation of Inkjet Recording Liquids 14–18: Variation Ratio of Particle Diameter, Filtration Property>

With respect to inkjet recording liquids 14–18, a variation ratio of a mean particle diameter and a filtration property of ink after storage when they were stored at 60° C. for 7 days, in a similar manner to example 4.

<Preparation of Images and Evaluation of Tone and Light Fastness>

Image samples 14–18 were prepared by utilizing each ink comprising inkjet recording liquids 14–18 in a similar manner to example 3, and tone of an image and light fastness of an image were evaluated.

The obtained results are shown in Table 3.

TABLE 3

| Image sample No. | Inkjet recording liquid | | | Image sample | | | |
|---|---|---|---|---|---|---|---|
| | No. | Com-pound | Filtration property | Variation of particle diameter | Tone | Light fastness | Remarks |
| 14 | 14 | Comparative compound 5 | B | C | A | 74 | Comparison |
| 15 | 15 | 1–12 | A | B | A | 87 | Invention |
| 16 | 16 | 1–21 | A | B | A | 88 | Invention |
| 17 | 17 | 1–57 | A | B | A | 83 | Invention |
| 18 | 18 | 1–60 | A | B | A | 82 | Invention |

It is clear from Table 3 that ink of this invention is superior in a variation ratio of a mean particle diameter of ink after storage and a filtration property of ink (that is, storage stability of ink), in addition to that tone of an image of image samples prepared by utilizing ink of this invention is excellent.

The invention claimed is:

1. An anthraquinone dye represented by the Formula (1):

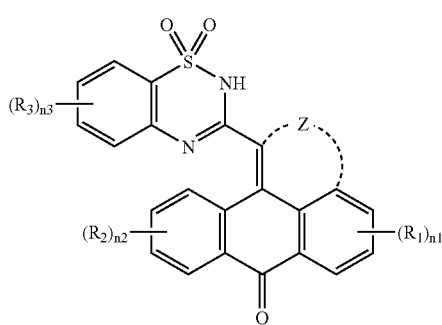

Formula (1)

wherein $R_1$, $R_2$ and $R_3$ each independently represents substituent, Z, represents a group made up of nonmetallic atoms necessary for forming a nitrogen containing 6-membered ring, n1 represents whole number of 0 to 3, n2 and n3 each represents whole number of 0 to 4, when n1, n2 or n3 represents 2, 3 or 4, each $R_1$, $R_2$ and $R_3$ are same or different.

2. An anthraquinone dye represented by the Formula (2):

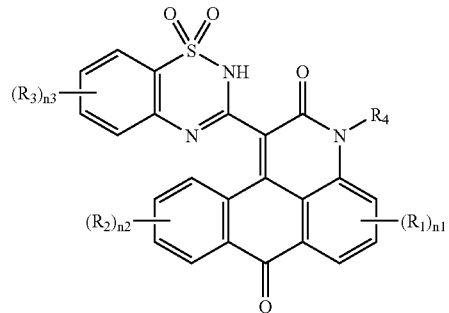

Formula (2)

wherein $R_1$, $R_2$ and $R_3$ each independently represents substituent, $R_4$ represents a hydrogen atom or a substituent, n1 represents whole number of 0 to 3, n2 and n3 each represents whole number of 0 to 4, when n1, n2 or n3 represents 2, 3 or 4, each $R_1$, $R_2$ and $R_3$ are same or different.

3. An anthraquinone dye represented by the Formula (3):

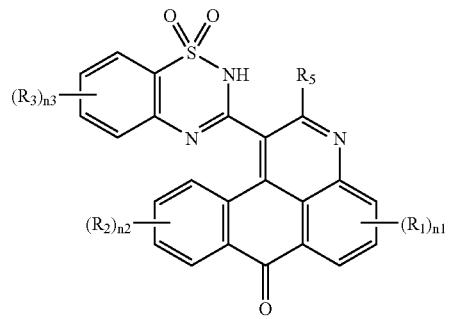

Formula (3)

wherein $R_1$, $R_2$ and $R_3$ each independently represents substituent, $R_5$ represents a hydrogen atom or a substituent, n1 represents whole number of 0 to 3, n2 and n3 each represents whole number of 0 to 4, when n1, n2 or n3 represents 2, 3 or 4, each $R_1$, $R_2$ and $R_3$ are same or different.

4. An anthraquinone dye of claim 1 represented by the Formula (1), wherein at least one of the $R_1$, $R_2$ and $R_3$ represents a sulfo group.

5. An anthraquinone dye of claim 2 represented by the Formula (2), wherein at least one of the $R_1$, $R_2$ and $R_3$ represents a sulfo group.

6. An anthraquinone dye of claim 3 represented by the Formula (3), wherein at least one of the $R_1$, $R_2$ and $R_3$ represents a sulfo group.

7. An ink jet recording liquid containing an anthraquinone dye represented by the Formula (1):

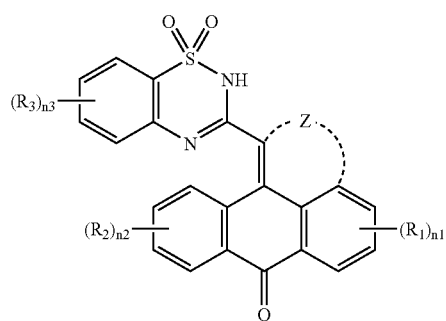

Formula (1)

wherein $R_1$, $R_2$ and $R_3$ each independently represents substituent, Z represents a group made up of nonmetallic atoms necessary for forming a nitorgen containing 6-membered ring, n1 represents whole number of 0 to 3, n2 and n3 each represents whole number of 0 to 4, when n1, n2 or n3 represents 2, 3 or 4, each $R_1$, $R_2$ and $R_3$ are same or, different.

8. An ink jet recording liquid containing an anthraquinone dye represented by by the Formula (2):

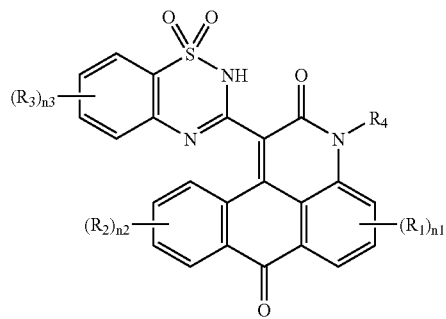

Formula (2)

wherein $R_1$, $R_2$ and $R_3$ each independently represents substituent, $R_4$ represents a hydrogen atom or a substituent, n1 represents whole number of 0 to 3, n2 and n3 each represents whole number of 0 to 4, when n1, n2 or n3 represents 2, 3 or 4, each $R_1$, $R_2$ and $R_3$ are same or different.

9. An ink jet recording liquid containing an anthraquinone dye represented by the Formula (3):

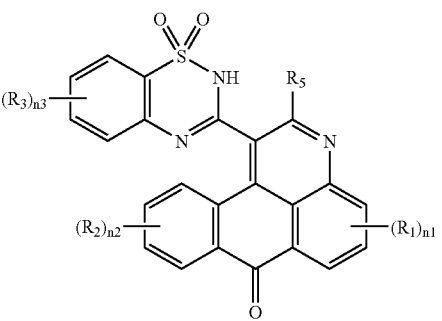

Formula (3)

wherein $R_1$, $R_2$ and $R_3$ each independently represents substituent, $R_5$ represents a hydrogen atom or a substituent, n1 represents whole number of 0 to 3, n2 and n3 each represents whole number of 0 to 4, when n1, n2 or n3 represents 2, 3 or 4, each $R_1$, $R_2$ and $R_3$ are same or different.

10. The ink jet recording liquid of claim 7, wherein the recording liquid further comprises an oil-soluble polymer and the dye forms together with the polymer fine particles dispersed in a medium.

11. The ink jet recording liquid of claim 8, wherein the recording liquid further comprises an oil-soluble polymer and the dye forms together with the polymer ink particles dispersed in a medium.

12. The inkjet recording liquid of claim 9, wherein the recording liquid further comprises an oil-soluble polymer and the dye forms together with the polymer fine particles dispersed in a medium.

\* \* \* \* \*